US008279328B2

(12) United States Patent
Lahav et al.

(10) Patent No.: US 8,279,328 B2
(45) Date of Patent: Oct. 2, 2012

(54) CMOS IMAGE SENSOR WITH WIDE (INTRA-SCENE) DYNAMIC RANGE

(75) Inventors: Assaf Lahav, Binyamina (IL); Amos Fenigstein, Haifa (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 266 days.

(21) Appl. No.: 12/837,074

(22) Filed: Jul. 15, 2010

(65) Prior Publication Data

US 2011/0013064 A1    Jan. 20, 2011

Related U.S. Application Data

(60) Provisional application No. 61/225,773, filed on Jul. 15, 2009.

(51) Int. Cl.
*H04N 5/235* (2006.01)
*G03B 7/00* (2006.01)
(52) U.S. Cl. .................. 348/362; 348/222.1; 348/294
(58) Field of Classification Search ............... 348/222.1, 348/294, 362
See application file for complete search history.

(56) References Cited

U.S. PATENT DOCUMENTS

| 6,175,383 | B1 | 1/2001 | Yadid-Pecht et al. | |
| 7,701,499 | B2 | 4/2010 | Barnea et al. | |
| 2005/0190272 | A1* | 9/2005 | Takahashi et al. | 348/222.1 |
| 2006/0256207 | A1* | 11/2006 | Kokubo et al. | 348/223.1 |

* cited by examiner

*Primary Examiner* — Gevell Selby
(74) *Attorney, Agent, or Firm* — Bever, Hoffman & Harms, LLP; Patrick T. Bever

(57) ABSTRACT

A CMOS image sensor uses a special exposure control circuit to independently adjust the photodiode exposure (integration) time for each pixel in a pixel array to obtain non-saturated photodiode charges for each pixel. Exposure time adjustment involves extrapolating a pixel's final photodiode charge using an intermediate photodiode charge measured after a predetermined portion of an exposure frame period. If the intermediate photodiode charge is, e.g., over 50% of the photodiode's full-well capacity after half of the exposure frame period, then saturation is likely and the photodiode is reset to integrate only during the remaining time. If not, then the photodiode integrates over the allotted exposure frame period. Data indicating the length of the exposure portion is stored as analog data on the memory node of each pixel, and readout of the final photodiode charge is performed using Correlated Double Sampling (CDS) techniques.

17 Claims, 12 Drawing Sheets

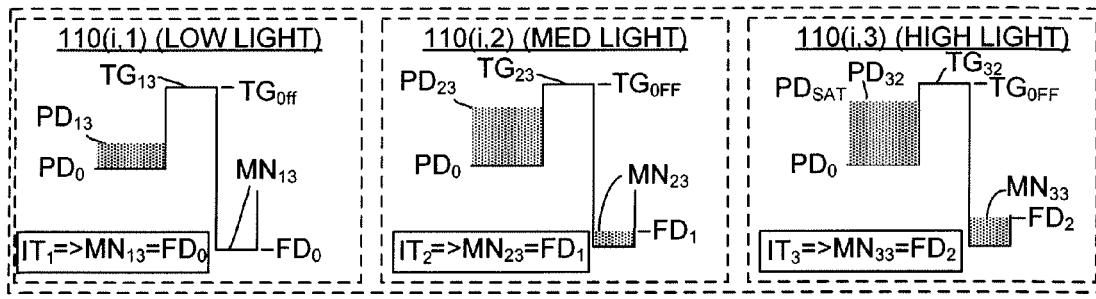
FIG. 18(A)
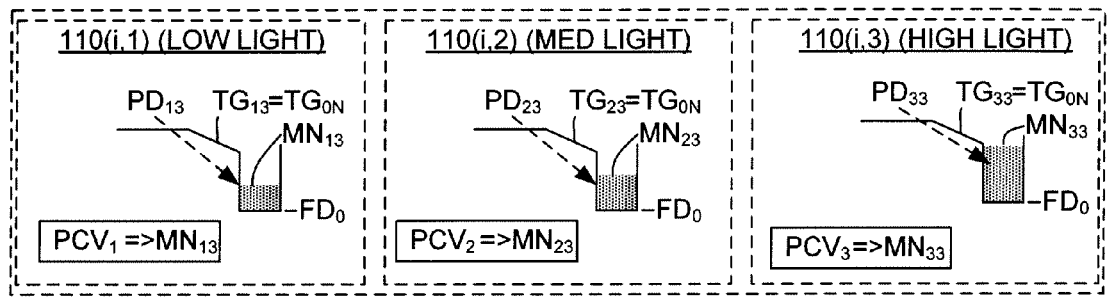
FIG. 18(B)
| 110(i,1) (LOW LIGHT) | 110(i,2) (MED LIGHT) | 110(i,3) (HIGH LIGHT) |
|---|---|---|
| IMAGE DATA$_1$ = $\frac{PCV_1}{IT_1}$ = $\frac{MN_{13}}{T_1+T_2+T_3}$ (FULL EXPOSURE FRAME PERIOD) | IMAGE DATA$_2$ = $\frac{PCV_2}{IT_2}$ = $\frac{MN_{23}}{T_2+T_3}$ (EXP FRAME PERIOD MINUS INTERVAL 1) | IMAGE DATA$_3$ = $\frac{PCV_3}{IT_3}$ = $\frac{MN_{33}}{T_3}$ (EXP FRAME PERIOD MINUS INTERVAL 1 & 2) |
FIG. 19

CMOS IMAGE SENSOR WITH WIDE (INTRA-SCENE) DYNAMIC RANGE

RELATED APPLICATIONS

This application claims priority of U.S. Provisional Patent Application 61/225,773, entitled "CMOS Image Sensor For Wide (intra-scene) DR Applications" filed Jul. 15, 2009.

FIELD OF THE INVENTION

This invention relates to CMOS image sensors, and more particularly to CMOS image sensors having a wide dynamic range that are used, for example, in high quality digital cameras.

BACKGROUND OF THE INVENTION

Sensor arrays are used, for example, in video cameras, and generally include a two dimensional array of pixels that is fabricated on a substrate. Each pixel includes a sensing element (e.g., a photodiode) that is capable of converting a portion of an optical (or other radiant source) image into an electronic (e.g., voltage) signal, and access circuitry that selectively couples the sensing element to control circuits dispose on a periphery of the pixel array by way of address and signal lines. The access circuitry typically includes metal address and signal lines that are supported in insulation material deposited over the upper surface of a semiconductor substrate, and positioned along the peripheral edges of the pixels to allow light to pass between the metal lines to the sensing elements through the insulation material. Most image sensors typically contain a large number (e.g., millions) of pixels which transform photons coming from a photographed scene or other optical image source into a large number of corresponding voltage signals, which are stored on a memory device and then read from the memory device and used to regenerate the optical image on, for example, a liquid crystal display (LCD) device.

One of the most important figures of merit for a camera sensor is it's dynamic range (DR), which is defined as the largest signal (in the non-saturated region) generated in the sensor corresponding to the bright areas of a scene, divided by the smallest signal which can be correctly detected (above sensor noise level) in the dark areas of the scene. Correctly capturing (i.e., "photographing") the dynamic range in a scene is a problem which is known from the early days of photography, where photographers used to "underexpose" a photography film in order to capture high light (bright) details of a scene, and "overexpose" a film in order to observe lowlight (dark) details in the scene. Although CMOS image sensors have improved significantly in the last decade in their ability to observe details in the dark (lowlight) areas of the scene (mainly by reducing the electronic read out noise, for example, with the use of pinned diode-type photodiodes with CDS), the dynamic range of CMOS image sensors still remains well below that of the human eye in their ability to capture all details in an uncontrolled lighting environment.

A straight forward approach to increase the dynamic range of a CMOS sensor is to increase the full-well capacity of the sensor's photodiodes. This approach usually improves the quality of data captures in the brighter areas of a scene (i.e., relatively brighter areas can be captured correctly without saturating the pixel in comparison to a sensor having photodiodes with smaller full-well capacities). However, increasing the full-well capacity of the sensor's photodiodes typically degrades the sensitivity of the sensor since more photoelectrons are generally needed to overcome the intrinsic noise of the pixels and the sensor reading circuit.

What is needed is a high dynamic range CMOS images sensor in which each pixel is able to either effectively "underexpose" the pixel's photodiode when the pixel is exposed to high light (bright) details of a scene, or effectively "overexpose" the pixel's photodiode when the pixel is exposed to lowlight (dark) details of the scene, and is able to achieve this function without significantly increasing either pixel cell size or control circuit complexity.

SUMMARY OF THE INVENTION

The present invention is directed to a high dynamic range (HDR) CMOS image sensor in which a special exposure control circuit includes exposure time adjustment circuitry that independently adjusts the photodiode exposure (integration) time for each pixel in a pixel array such that optimal non-saturated photodiode charge is obtained for each pixel. The exposure time adjustment generally involves determining whether an intermediate photodiode charge stored on the photodiode of a selected pixel, which increases linearly with time, is above a predetermined "extrapolated saturation" value after a predetermined portion of an exposure frame period. For example, after half the exposure frame period the charge collected on a photodiode should be less than half of the photodiode's Full-Well-Capacity, or else at the end of integration time the photodiode will likely be in saturation. If the intermediate photodiode charge is above the extrapolated saturation value, which indicates that saturation is likely to occur before the end of the exposure frame period, the exposure time adjustment circuitry actuates a reset gate transistor and a transfer gate transistor inside the selected pixel to reset the photodiode to a reset charge such that integration is restarted and proceeds only during a remaining portion of the allotted exposure frame period. If the intermediate photodiode charge is well below the extrapolated saturation level, the exposure time adjustment circuitry leaves the photodiode charge undisturbed (i.e., such that the photodiode charge continues to integrate from the beginning of the exposure frame period). By independently resetting the photodiodes of pixels only when saturation can be extrapolated from the intermediate photodiode charge values obtained after the predetermined portion of an exposure frame period, the exposure time adjustment circuitry serves to effectively shorten (reduce) a pixel's exposure time when its photodiode is exposed to bright (high light) details of a captured scene, whereby the final pixel image value can be calculated, e.g., by dividing the final non-saturated photodiode charge value by a relatively small time value representing the shortened exposure time. Conversely, the exposure time adjustment circuitry effectively maximizes the exposure time of each pixel whose photodiode is exposed to dark (lowlight) details of a captured scene, whereby the final pixel image value can be calculated, for example, by dividing the final non-saturated photodiode charge value by a relatively large time value representing the full exposure frame period. In this way, the HDR CMOS image sensor of the present invention provides high dynamic range by facilitating selective "underexposure" of pixels exposed to bright details of a scene (i.e., by shortening the exposure period) and "overexposure" of pixels exposed to lowlight (dark) details of the scene (i.e., by maximizing the exposure period).

According to an aspect of the present invention, the special exposure control circuit includes a photodiode reset and integration time write-in circuit that facilitates writing initial exposure time values into each pixel at the beginning of an associated exposure frame period, writing updated exposure time values into at least some of the pixels after a saturation check process, and then calculating an image data value for each of the pixels using final photodiode charge values and exposure time values read from each of the pixels at the end of the associated exposure frame period. In one embodiment, writing the initial exposure time value at the beginning of an associated exposure frame period includes resetting the photodiode charge, turning off a transfer gate transistor separating the photodiode from a memory node, and then storing a first analog signal (i.e., the initial exposure time value) on the memory node. Similarly, when a pixel is deteimined to be saturated at the end of the saturation check process, writing the updated exposure time value includes resetting the photodiode charge, turning off the transfer gate transistor, and then storing a second analog signal on the memory node. At the end of the exposure frame period, both the exposure time value and the final photodiode charge value are read from each pixel and utilized to calculate the pixel's final image value. By storing exposure time value on each pixel in the manner, the HDR image sensor of the present invention is able to provide independently adjusted photodiode exposure (integration) times for each pixel without significantly increasing either pixel cell size or control circuit complexity.

According to another aspect of the present invention, the saturation check process is performed by applying a saturation check voltage to gate terminal of the transfer gate transistor, wherein the saturation check voltage is between the fully off and fully on transfer gate potentials such that the transfer gate transistor passes a portion of the current (intermediate) photodiode charge to the memory node only if the intermediate charge is above a predetermined value (e.g., above one-half of the photodiode capacity after one-half of the exposure frame period). In one embodiment, each pixel includes a transfer gate control transistor that selectively passes the saturation check voltage to gate terminal of the transfer gate transistor, thereby allowing pixel level control over the saturation check process.

According to another aspect of the present invention, the special exposure control circuit also includes circuitry for reading the non-saturated photodiode charge from each pixel using low noise Correlated Double Sampling (CDS) techniques. In particular, because each pixel includes a transfer gate transistor between the fully-pinned photodiode and the memory node, the HDR CMOS image sensor of the present invention is also capable of performing a CDS readout process at the end of the frame time period by writing a reset value to the memory node (e.g., after reading the final exposure time value), and then sequentially reading the reset value and the final non-saturated photodiode charge value from each pixel. Because CDS techniques are utilized during readout of the final non-saturated photodiode charge, the HDR CMOS image sensor of the present invention provides superior image data quality over a wide dynamic range.

According to yet another aspect of the invention, each pixel's allotted exposure frame period (i.e., its available integration period) is partitioned into two or more successively shorter interval time periods, and the exposure control circuit selectively performs the saturation check process described above at the end of each interval time period. For example, if the intermediate charge on a photodiode of a given pixel is below the predetermined extrapolated saturation value at the end of the first interval time period (thus indicating it is exposed to low light), the pixel's photodiode is allowed to continue receiving light during all subsequent interval time periods (i.e., the photodiode's charge is not disturbed after the first interval time period), thereby applying a relatively long exposure time to the given pixel. Conversely, if the intermediate photodiode charge of a given pixel is above the predetermined value at the end of the first interval time period (thus indicating it is exposed to bright light), the pixel's photodiode is reset and exposure is restarted during the shorter (second) interval time period, thereby applying a relatively short exposure time to the given pixel. The process of resetting only those photodiodes that are saturated at the end of each progressively shorter interval time period is repeated until the end of the allotted frame time, when the final photodiode charge value stored on the photodiode of each pixel is read out, and each pixel's image data value is then calculated both by the final photodiode charge value and the associated portion of the exposure frame time over which the final photodiode charge value was generated (e.g., using interval time data stored on each pixel). By providing a suitable series of successively shorter interval time periods within each exposure frame time, by resetting the pixel's photodiode after each time period in which extrapolated saturation of the photodiode is detected, and by knowing the length of the one or more interval time periods in which the final photodiode charge values are generated by the pixel, the present invention provides a special exposure control mechanism that effectively "underexposes" each pixel that is exposed to high light (bright) details of a scene, and effectively "overexposes" (i.e., maximizes the integration time of) each pixel that is exposed to low light (dark) details of a scene, thereby optimizing the exposure time of each pixel to provide optimal non-saturated photodiode charge values that produce superior high dynamic range image information.

BRIEF DESCRIPTION OF THE DRAWINGS

These and other features, aspects and advantages of the present invention will become better understood with regard to the following description, appended claims, and accompanying drawings, where:

FIGS. 18(A) and 18(B) are potential diagrams depicting three pixels of the HDR CMOS image sensor of FIG. 1 during operation utilizing the method of FIG. 15 at the end of a third integration period of the three interval time periods of FIG. 14 according to the exemplary embodiment of the present invention; and FIG. 19 is a simplified diagram depicting calculation of image data values for the three pixels of the HDR CMOS image sensor of FIG. 1 after operation utilizing the method of FIG. 15 according to the exemplary embodiment of the present invention.

DETAILED DESCRIPTION OF THE DRAWINGS

The present invention relates to an improvement in CMOS image sensors, and more particularly to improvements in high density large arrays HDR CMOS image sensors for imaging application. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). In addition, relative terms such as "above", "below" and "under" are intended to denote relative differences, and not intended to be literally interpreted unless otherwise specified. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
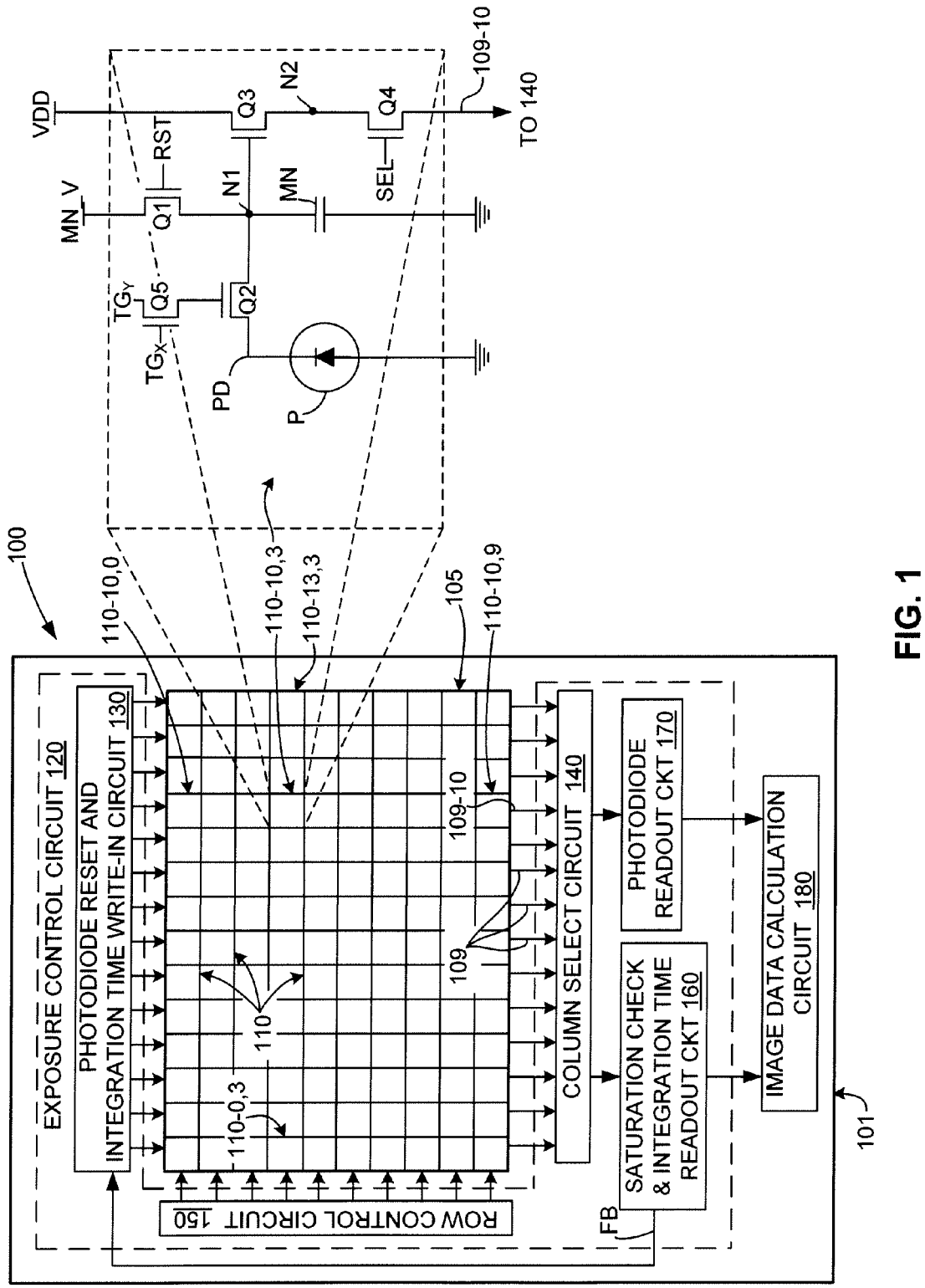
FIG. 1 is a simplified perspective diagram showing a HDR CMOS image sensor according to an embodiment of the present invention.

FIG. 1 is a simplified diagram showing a simplified CMOS image sensor 100 formed in accordance with a generalized embodiment of the present invention. CMOS image sensor 100 is similar to conventional CMOS image sensors in that it is formed on a semiconductor (e.g., monocrystalline silicon) substrate 101 using CMOS fabrication techniques, and includes a pixel array 105 including pixels 110 arranged in rows and columns, and an exposure control circuit 120 and additional control circuitry that access pixels 110 by way of associated metal control lines (not shown) passing between the rows and columns of pixel array 105.

In the exemplary simplified embodiment, pixel array 105 is arranged such that the columns of pixels 110 are aligned vertically, and the pixel rows are aligned horizontally. For example, pixels 110-10,0, 110-10,3, and 110-10,9, which are aligned vertically in FIG. 1, form one of fourteen pixel columns, and pixels 110-0,3, 110-10,3, and 110-13,3, which are arranged horizontally, form one of ten pixel rows. As described in additional detail below, the pixel rows are accessed sequentially during readout operations by way of control signals that are described below, and analog signals (i.e., integration time values and signal values, both discussed below) generated by each pixel are transmitted on column signal lines 109. For example, during a first time period all of the pixels in the first row of pixel array 105 (e.g., pixel 110-10,0) are accessed, and analog values generated by the first row are transmitted onto associated column signal lines (e.g., signal line 109-10). Those skilled in the art will recognize that pixel array 105 is shown with a small number of pixels for explanatory purposes, and that an actual sensor formed in accordance with the present invention for would typically include between 2,000,000 and 60,000,0000 pixels, although aspects of the present invention may be beneficially utilized in image sensors having fewer pixels or a larger number of pixels.

A simplified pixel 110-10,3, which is exemplary of all pixels 110, is shown in an enlarged fashion in the upper right portion of FIG. 1. Similar to conventional 4T CMOS image sensors, each pixel 110 of CMOS image sensor 100 (e.g., pixel 110-13) includes a CMOS pinned photodiode P, a reset select transistor Q1, a memory node structure MN, a transfer gate transistor Q2, a source-follower transistor Q3, a select transistor Q4, a transfer gate control transistor Q5. CMOS photodiode P is fabricated on a semiconductor (e.g. silicon) substrate using known techniques. Reset transistor Q1 is coupled between a memory node voltage source MN_V and a first internal node N1 defined by memory node structure MN, and is controlled by a control signal RST. Transfer gate transistor Q2 is connected between photodiode PD and first node N1, and is controlled by a signal passed through transfer gate control transistor Q5 in the manner set forth below. Source-follower transistor Q3 is connected between signal source VDD and a second internal node N2, and is controlled by a voltage present on first node N1 to generate a pixel output signal at node N2. Select transistor Q4 is connected between associated column signal line 109-10 and node N2, and receives a select control signal SEL during the read operations that couples node N2 to signal line 109-10. Memory node structure MN (also referred to herein as "memory node MN") utilizes a floating diffusion (represented by a capacitor symbol in FIG. 1 for illustrative purposes) to store analog signals (memory node charges) on first node N1 in the manner described below. In a preferred embodiment, memory node MN is shielded from light by metallization (e.g., M1) structures, and also includes a p-blocking layer (not shown) disposed beneath the n-type floating diffusion and optimized to reduce dark current and the number of bright spots.

According to an aspect of the present invention, exposure control circuit 120 generally includes a photodiode reset and integration time write-in circuit 130, a column select circuit 140 and a saturation check and integration time readout circuit 160 that cooperatively provide exposure time adjustment circuitry for independently adjusting the photodiode exposure (integration) time of each pixel 110 in pixel array 105 in order to obtain a non-saturated photodiode charge from each pixel 110 at the end of each pixel's exposure frame period. As set forth in additional detail below, the exposure time adjustment process performed by circuits 130, 140 and 160 generally involves determining whether an intermediate photodiode charge PD stored on the photodiode of a selected pixel (e.g., at node PD of pixel 110-10,0 shown at the right of FIG. 1) is above a predetermined "extrapolated saturation" value after a predetermined portion (e.g., two-thirds) of the pixel's total exposure frame period. If the intermediate photodiode charge PD is greater than the extrapolated saturation value, then the exposure time adjustment circuitry actuates reset gate transistor Q1 and transfer gate transistor Q2 of the selected pixel to reset photodiode charge PD to a reset charge potential (e.g., a fully-pinned voltage $V_{PINNED}$), thereby causing photodiode P to integrate only during the remaining portion (e.g., final one-third) of the pixel's total exposure frame period. If the intermediate photodiode charge PD is below the extrapolated saturation value, the exposure time adjustment circuitry leaves photodiode charge PD undisturbed (i.e., such that photodiode charge PD integrates during the entire exposure frame period). By independently resetting the photodiodes of pixels only when saturation (or close to saturation) is detected after the predetermined portion of an exposure frame period, the exposure time adjustment circuitry serves to effectively shorten (reduce) the exposure time of each pixel whose photodiode is exposed to bright (high light) details of a captured scene, whereby the final pixel image value can be calculated, e.g., by dividing the final non-saturated photodiode charge value by a relatively small time value representing the shortened exposure time. Conversely, the exposure time adjustment circuitry effectively maximizes the exposure time of each pixel whose photodiode is exposed to dark (lowlight) details of a captured scene, whereby the final pixel image value can be calculated, for example, by dividing the final non-saturated photodiode charge value by a relatively large time value representing the full exposure frame period.

Various novel aspects of HDR image sensor 100 will now be described with reference to FIGS. 2-19. For example, referring briefly to FIG. 1, in addition to functioning during the adjustment of exposure times of each pixel in array 105, photodiode reset and integration time write-in circuit 130, column select circuit 140 and saturation check and integration time readout circuit 160 also cooperate to write integration time values into each pixel 110 according to the various embodiments and examples set forth below. In addition, exposure control circuit 120 further includes a photodiode readout circuit 170 for reading out the non-saturated photodiode charge from the photodiode P of each pixel 110 using low noise Correlated Double Sampling (CDS) techniques, and an image data calculation circuit 180 for calculating image data values for each pixel using both the non-saturated photodiode charge and the applied exposure time. The exposure adjustment and read operations mentioned above and described in additional detail below are initiated using select control signals and other control signals generated by clock/control circuitry and column/address circuitry according to timing characteristics described in examples provided below, and transmitted to pixels 110 utilizing addressing schemes understood by those skilled in the art. Those skilled in the art understand that the functional description set forth below may be implemented utilizing various specific circuit arrangements. Therefore, the invention is described below only with reference to specific functions performed by exposure control circuit 120, and details relating to specific control circuitry are omitted for brevity.

Figure 2:
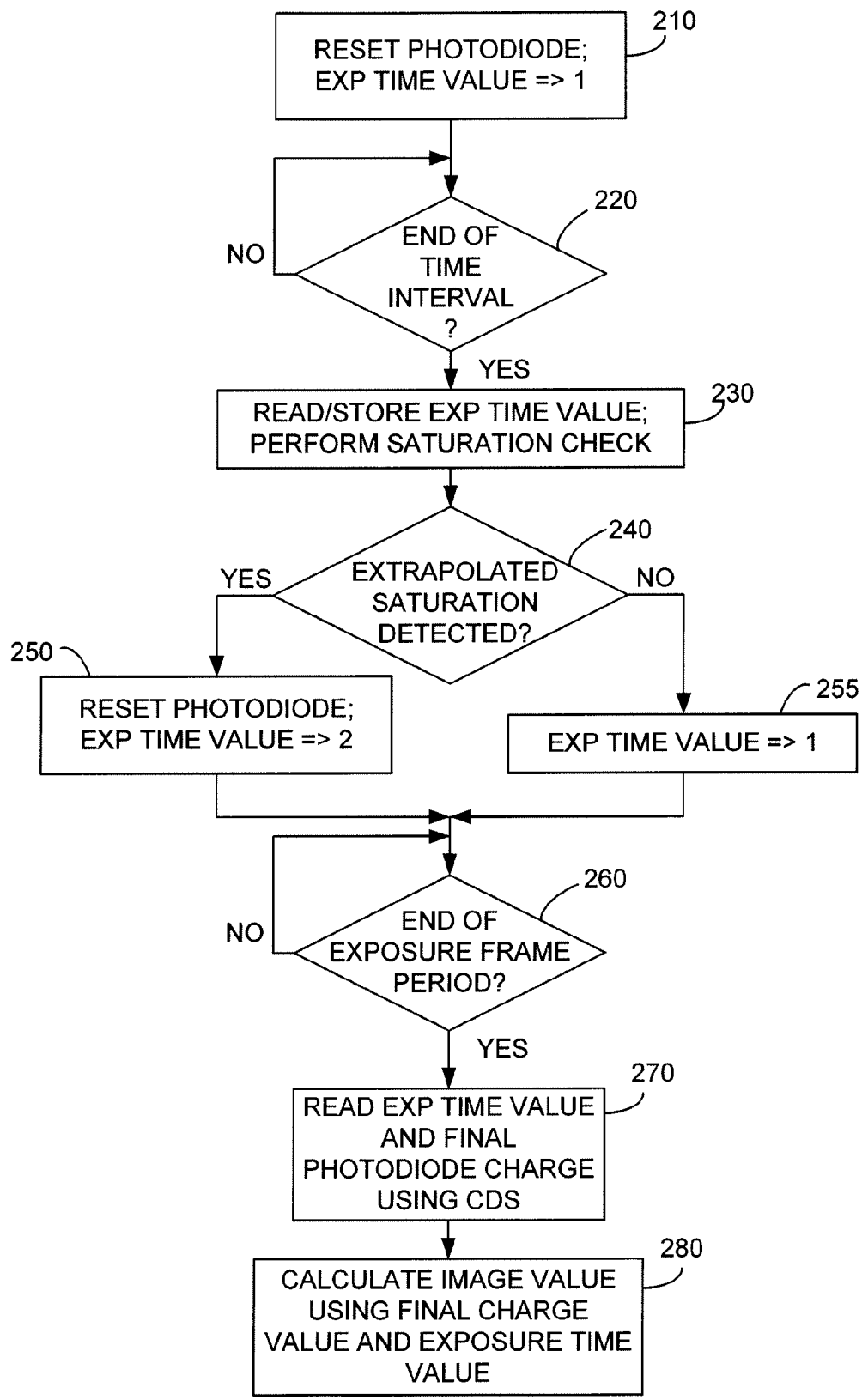
FIG. 2 is flow diagram showing a simplified method for generating image data from a single pixel of the HDR CMOS image sensor of FIG. 1 according to another embodiment of the present invention.

FIG. 2 is a simplified flow diagram showing generalized functions performed by exposure control circuit 120 during operation of a single pixel 110 of image sensor 100 (FIG. 1) according to an embodiment of the present invention. The operations indicated in FIG. 2 are described below with reference to cell 110-10,0 in FIG. 1. Note that normal operation extends the single-pixel operation described below to a row-by-row ("rolling shutter") operation consistent with known techniques.

Referring to block 210 at the upper portion of FIG. 2, the operation begins at the beginning of an exposure frame period by resetting a charge stored on the photodiode of a selected pixel of the pixel array to an initial photodiode charge and for storing an initial (first) exposure time value (e.g., 1) in the selected pixel. Referring to FIG. 1, this operation is performed in cell 110-10,0, for example, by generating control signals RST, $TG_X$ and $TG_Y$ such that reset gate transistor Q1 and transfer gate transistor Q2 are turned on to transfer an initial photodiode charge (e.g., $V_{PINNED}$ or $PD_0$) applied on memory node voltage source MN_V to photodiode P (i.e., such that the initial photodiode charge is stored at node PD), then toggling $TG_X$ or $TG_Y$ to turn off transfer gate transistor Q2 (i.e., isolating node PD from memory node MN), and then writing the initial exposure time value (e.g., "1") on node N1 (e.g., by maintaining reset gate transistor Q1 in an "on" state and causing memory node voltage source MN_V to supply the desired initial exposure time value). According to an aspect of the invention, exposure time values are stored as analog signal values on node N1, where each exposure time value is represented by a unique voltage level. Note that the presence of transfer gate transistor Q2 between node PD and node N1 in each pixel 110 is necessary in order to store the initial exposure time value on memory node MN.

Referring to block 220 at the upper portion of FIG. 2, the operation next involves allowing the photodiode charge to integrate (charge) in response to the applied light until the end of a predetermined time interval, which in the present embodiment is equal to one-half of the full exposure frame period. At the end of the time interval (YES in block 220), the initial exposure time value is optionally read from each pixel, and then a saturation check is performed (block 230). Referring to FIG. 1, in one embodiment this process involves accessing pixel 110-10,0 by turning on select transistor Q4 (transfer gate transistor Q2 remains off) and reading the initial exposure time value stored on memory node MN, and then partially turning on transfer gate transistor Q2 in the manner described below and determining if the potential at node N1 is changed. If saturation is detected (YES in block 240), then the photodiode PD is reset (block 250) in the manner described above, and then an updated (second) exposure time value (e.g., "2") is written onto memory node MN (i.e., a second analog value is written onto node N1 after transfer gate transistor Q2 is turned off). If saturation is not detected (NO in block 240), then the first exposure time value (e.g., "1") is re-written onto memory node MN after transfer gate transistor Q2 is turned off. Note that, if saturation is not detected, the charge at photodiode PD remains undisturbed.

Referring to block 260 near the bottom of FIG. 2, the operation next involves allowing the photodiode charge to continue integrating until the end of the full exposure frame period (YES in block 260). At this point, the final exposure time value and the final photodiode charge are read from each pixel (block 270), and then final image values are calculated (block 280). Referring to FIG. 1, reading the final exposure time value involves turning on select transistor Q4 (transfer gate transistor Q2 remains off) and reading the signal generated on line 109-10. Note that the final exposure time value is equal to the initial exposure time value (e.g., "1") if the saturation check was negative in block 240, and the final exposure time value is equal to the updated exposure time value (e.g., "2") if the saturation check was positive in block 240. In one embodiment described in additional detail below, a reset value is written to and read from the memory node after reading the final exposure time values and before reading the final photodiode charge value, thereby facilitating a highly accurate CDS reading of the final photodiode charge value. Transfer gate transistor Q2 is then fully turned on to transfer the final photodiode charge to memory node MN, which is then transferred to signal line 109-10 and stored as described above. Referring again the bottom of FIG. 2, in one embodiment the calculation of image values involves multiplying the final charge value read from each pixel by the final exposure time value read from each pixel. For example, a final image value for a pixel that was reset after the saturation check would be multiplied by "2" to account for the shorter exposure period. Conversely, a final image value for a pixel that was not reset after the saturation check would be multiplied by "1" to account for the longer exposure period.

FIGS. 3-6 depict alternative pixel and pixel array arrangements according to two alternative specific embodiments of the present invention.

Figure 3:
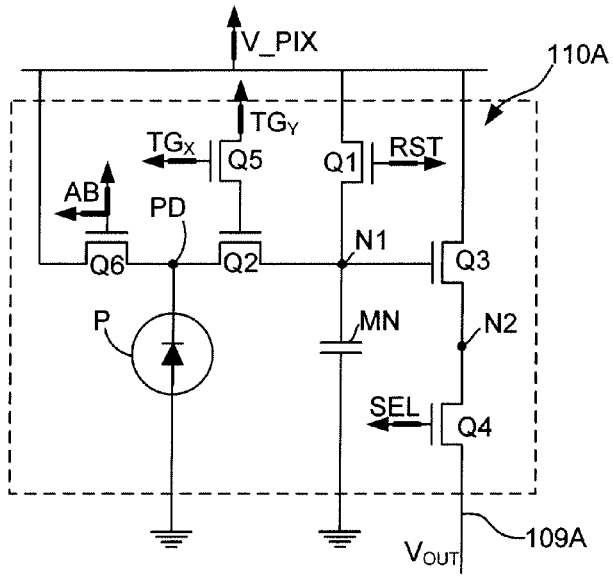
FIG. 3 is a simplified circuit diagram showing a pixel of the HDR CMOS image sensor of FIG. 1 according to a specific embodiment of the present invention.

FIG. 3 is a simplified schematic diagram showing a pixel 110A according to a first specific embodiment. Pixel 110A includes a fully-pinned photodiode P that generates a photodiode potential on node PD, a memory node MN that defines a first node N1, and control transistors Q1-Q6 including a reset gate transistor Q1, a transfer gate transistor Q2, a source-follower transistor Q3, a select transistor Q4, a select transistor Q5, and an optional anti-blooming (AB) transistor Q6. Reset gate transistor Q1 is coupled between a shared pixel voltage source V_PIX and memory node MN, and is controlled by a control signal RST. Transfer gate transistor Q2 is coupled between photodiode node PD and node N1, and is controlled by signal TGY, which is passed to the gate terminal of transfer gate transistor Q2 by transfer gate control transistor Q5. Source-follower transistor Q3 is connected in series with select transistor Q4 and an associated column signal line 109A, and has a gate terminal connected to node N1. Select transistor Q4 receives row control signal SEL. Finally, each pixel also includes an optional anti-blooming transistor Q6, which functions in a manner known to those skilled in the art. In one embodiment, all of transistors Q1-Q6 are n-channel devices.

Figure 4:
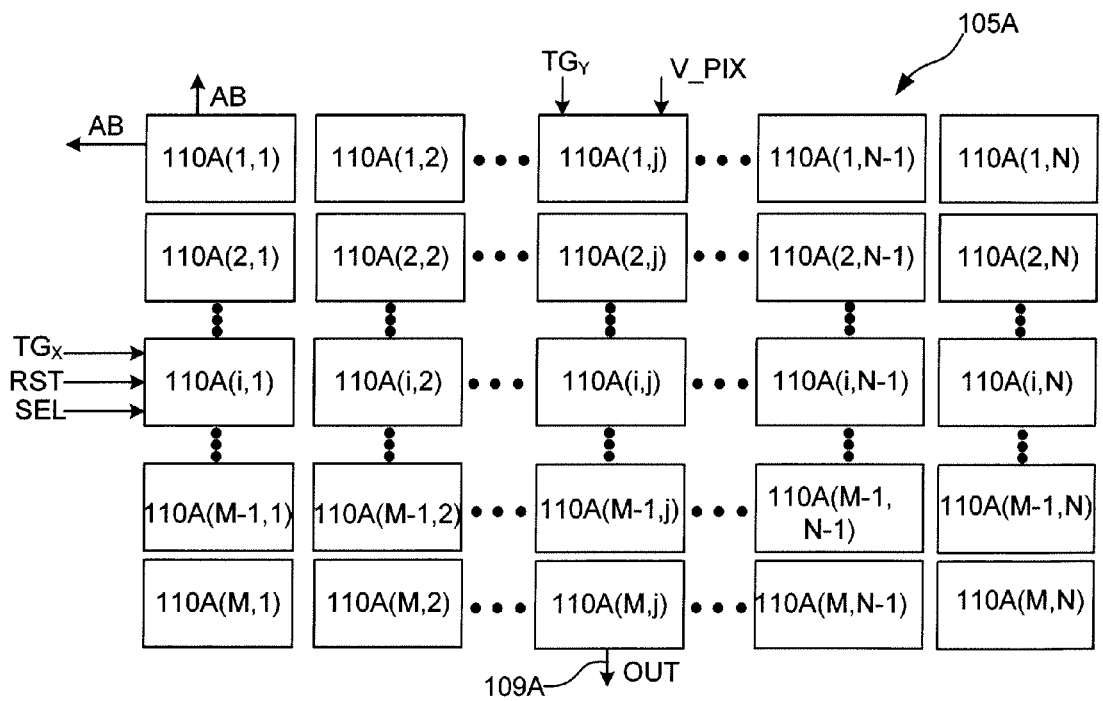
FIG. 4 is a block diagram showing an exemplary pixel array arrangement including the pixel of FIG. 3.

FIG. 4 is a simplified block diagram showing multiple pixels 110A(1,1) to 110A(M,N) arranged in an array 105A, and indicates the source (row or column) of the applied control signals (which are also is indicated in FIG. 3 by horizontal or vertical arrows). For example, control signal $TG_Y$, pixel supply voltage V_PIX and output signal lines 109A are transmitted on column-wise control lines, and control signals $TG_X$, RST and SEL are transmitted on row-wise control lines. The optional AB gates are connected together for the entire pixel array.

Figure 5:
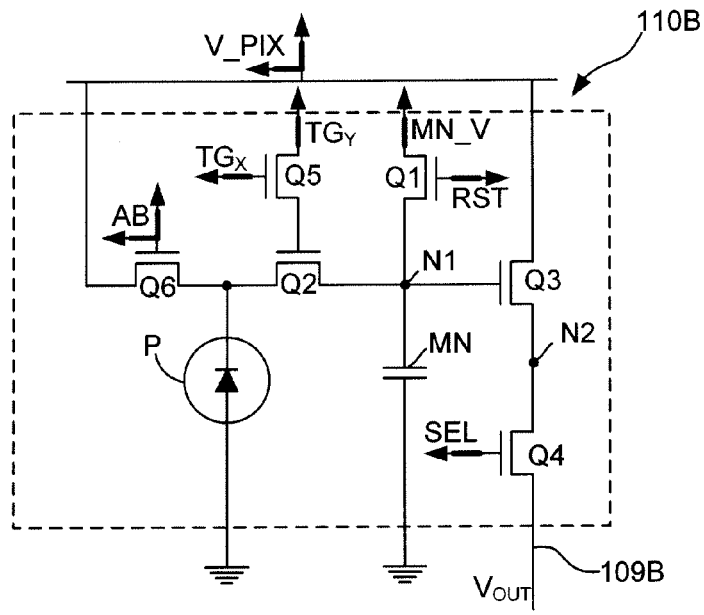
FIG. 5 is a simplified circuit diagram showing a pixel of the HDR CMOS image sensor of FIG. 1 according to another specific embodiment of the present invention.

FIG. 5 is a simplified schematic diagram showing a pixel 110B according to a second specific embodiment. Like pixel 110A, pixel 110B includes a fully-pinned photodiode P, a floating diffusion FD, and control transistors Q1-Q6 including reset gate transistor Q1, transfer gate transistor Q2, source-follower transistor Q3, select transistor Q4, select transistor Q5, and optional anti-blooming (AB) transistor Q6 that are arranged substantially as described above. However, pixel 110B differs from pixel 110A in that the drain of source-follower transistor Q3 is globally connected to pixel supply voltage V_PIX (i.e., all pixels 110B(1,1) to 110B(M,N) in array 105B, shown in FIG. 6, receive the same signal V_PIX). Further, an additional memory node control signal MN_V is connected to drain of reset transistor Q1 for all the pixels on the same column. The drain of optional AB transistor Q6 is connected to the global V_PIX.

Figure 6:
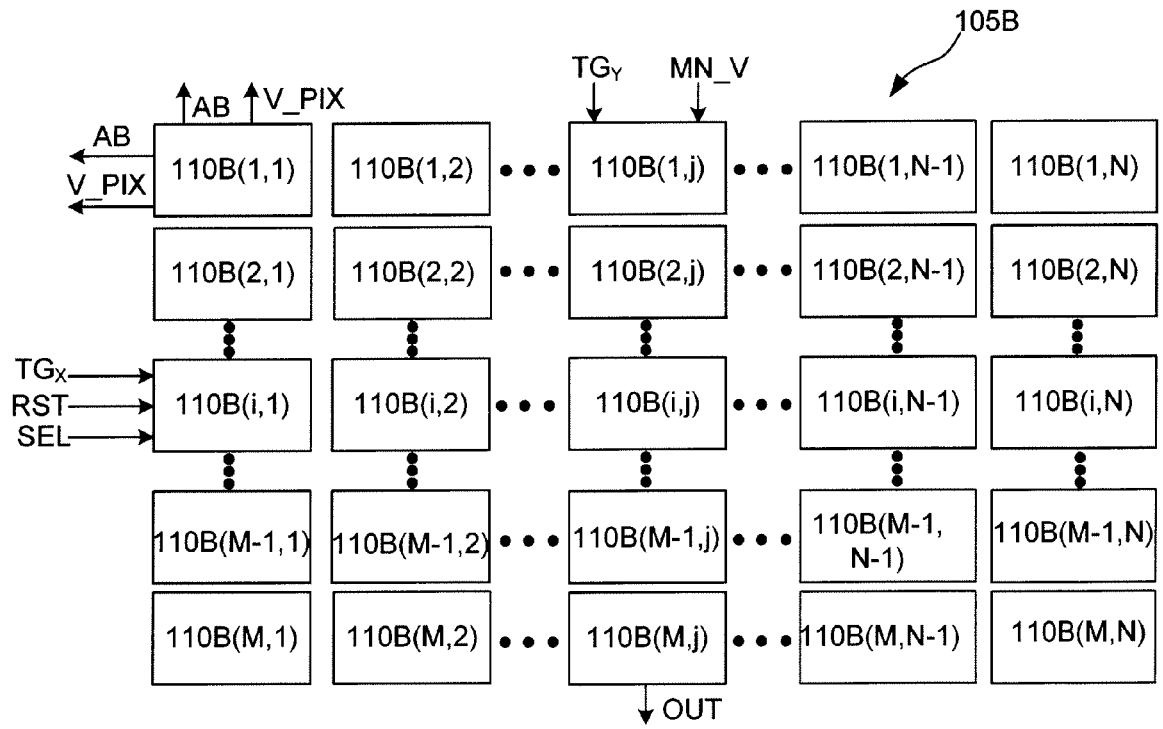
FIG. 6 is a simplified block diagram showing an exemplary pixel array arrangement including the pixel of FIG. 5.

FIG. 6 is a simplified block diagram showing the source (row or column) of the control signals supplied to pixels 110B(1,1) to 110B(M,N) of array 105B. Control signal $TG_Y$, memory node control signal MN_V and output signal lines 109A are transmitted on column-wise control lines, and control signals $TG_X$, RST and SEL are transmitted on row-wise control lines. The VPIX signal line and the optional AB gates are connected together for the entire pixel array. Note that a system voltage VDD may be used in place of V_PIX as a global control signal due to the additional column wise control memory node control signal MN_V added for each pixel.

Figure 7:
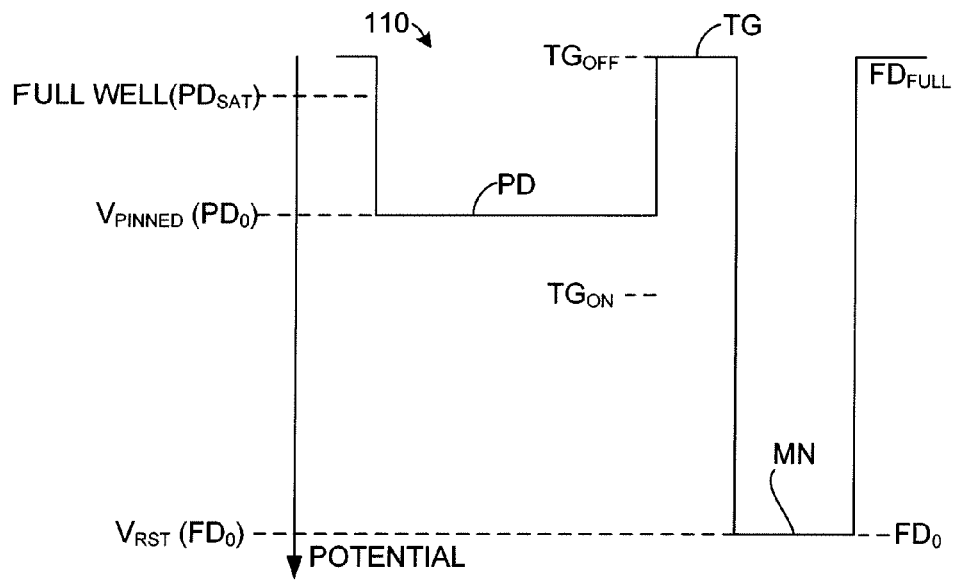
FIG. 7 is a potential diagram showing relative exemplary charges stored on an exemplary pixel of the HDR CMOS image sensor of FIG. 1.

FIG. 7 is a potential diagram depicting the three potentials generated on each pixel 110 of HDR image sensor 100 during normal operation. It is well known (prior art) that a fully-pinned photodiode can be used for low noise operation by evacuating all electrons from the photodiode to a floating diffusion (FD), which is used herein to denote the source of for charges on memory node MN in pixel 110. Referring to FIG. 7, each pixel memory node 110 includes a photodiode potential PD (i.e., the potential generated at node PD; see FIG. 1), a memory node MN charge (i.e., the potential generated at node N1 by memory node MN; see FIG. 1), and a transfer gate potential TG, which is the barrier imposed by transfer gate transistor Q2 between memory node MN and node PD (see FIG. 1). As understood by those in the art, the size and composition of photodiode P determines the amount of charge (number of electrons) that can be stored potential PD between its "empty" (pinned) potential (i.e., $V_{PINNED}$ or $PD_0$) and its full well "saturated" potential ($PD_{SAT}$). The potential at node potential MN ranges from a low potential $FD_0$, which is lower than "empty" potential $PD_0$, to a high potential $FD_{FULL}$. The barrier imposed by transfer gate transistor Q2 ranges from a relatively low on (activated) potential $TG_{ON}$ to a relatively high off (de-activated) potential $TG_{OFF}$, where potential $TG_{ON}$ is substantially below "empty" potential $Pa_0$ to facilitate full transfer of charge from node PD to memory node MN during read operations, and potential $TG_{OFF}$ is higher by a few mV than the saturated potential $PD_{SAT}$, of photodiode PD.

Figure 8A:
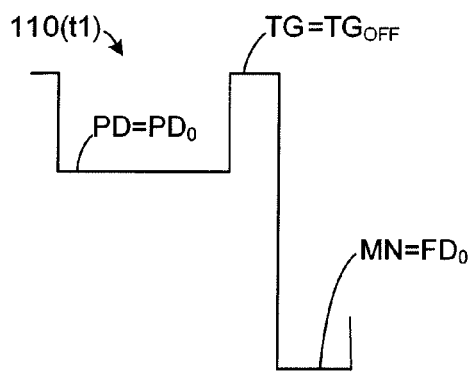
FIGS. 8(A), 8(B) and 8(C) are simplified potential diagrams showing exemplary pixel charges stored on a pixel of the HDR CMOS image sensor of FIG. 1 during operation.
Figure 8B:
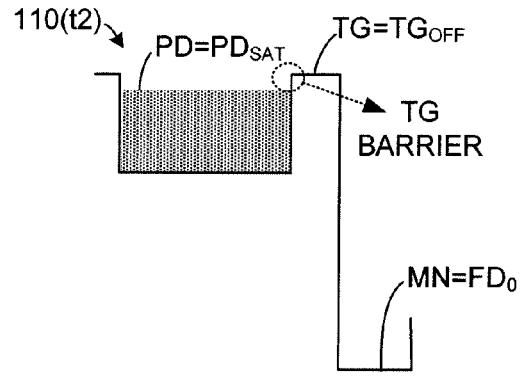
Figure 8C:
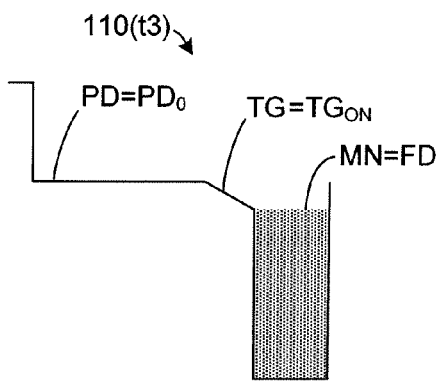

FIGS. 8(A), 8(B) and 8(C) are potential diagrams depicting pixel 110 at various operation times t1, t2 and t3, respectively. FIG. 8(A) shows pixel 110(t1) at the start of an integration process. The photodiode potential PD is set at $PD_0$ while the (de-activated) transfer gate voltage TG imposes a barrier for electrons and preventing flow from the photodiode to memory node MN, which is initially set at $FD_0$. The potential diagram for a pinned PD which is full of electrons is illustrated on FIG. 8(B). As indicated by the dotted circle and arrow in FIG. 8(B), when transfer gate voltage TG equals $TG_{OFF}$, the resulting transfer gate barrier is a few mV higher than the full-well-capacity potential $PD_{SAT}$ to prevent electrons from flowing from photodiode PD to memory node MN when the transfer gate is turned off. Full transfer of all electrons of from the diode is achieved by lowering the TG barrier to $TG_{ON}$ (i.e., below the pinned potential $PD_0$ and above the FD potential, as illustrated in FIG. 8(C)).

According to another aspect of the present invention, the saturation check process (e.g., block 230 in FIG. 2) is performed by applying a saturation check voltage $TG_{SAT-CHK}$ the transfer gate transistor Q2 (see FIG. 1), where a voltage level of saturation check voltage $TG_{SAT-CHK}$ is selected to cause transfer gate transistor Q2 to pass a portion of the current (intermediate) photodiode charge stored on node PD to the memory node MN only if the stored charge is substantially equal to a predetermined value (e.g., a level from which saturation can be extrapolated, as described below).

Figure 9A:
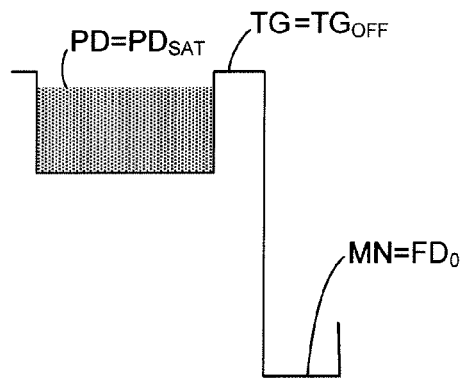
FIGS. 9(A) and 9(B) are simplified potential diagrams showing first exemplary pixel charges on a pixel of the HDR CMOS image sensor of FIG. 1 during a saturation check process performed according to an embodiment of the present invention.
Figure 9B:
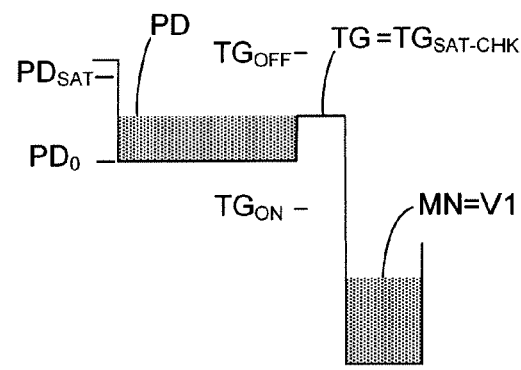
Figure 10A:
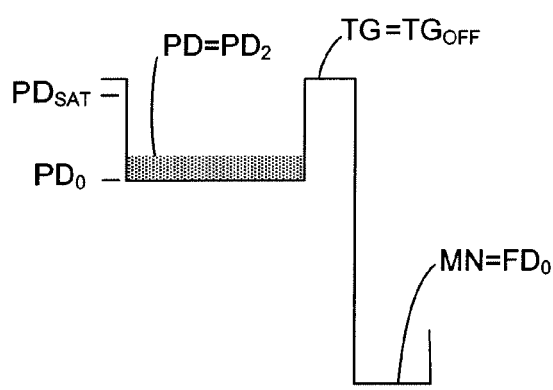
FIGS. 10(A) and 10(B) are simplified potential diagrams showing second exemplary pixel charges on a pixel of the HDR CMOS image sensor of FIG. 1 during the saturation check process performed according to the present invention.
Figure 10B:
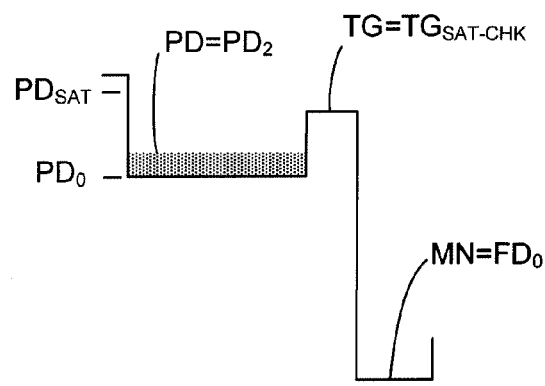

FIGS. 9(A) and 9(B) are potential diagrams illustrating the application of saturation check voltage $TG_{SAT-CHK}$ to the transfer gate transistor of a selected pixel. Using the convention set forth above with references to FIGS. 7 and 8, FIG. 9(A) shows that the stored photodiode potential is saturated (i.e., $PD=PD_{SAT}$) and that the transfer gate is de-activated (i.e., transfer barrier potential $TG=TG_{OFF}$), thereby preventing the transfer of any of the photodiode charge to memory node MN, which is set at a known potential (i.e., $MN=FD_0$). As indicated in FIG. 9(B), in order to check for saturation, the transfer gate barrier potential TG is lowered from $TG_{OFF}$ to saturation check voltage $TG_{SAT-CHK}$, which has a barrier potential between $TG_{OFF}$ and $TG_{OFF}$, preferably at a level from which saturation at the end of the allotted exposure frame period can be extrapolated. Saturation check voltage $TG_{SAT-CHK}$ is applied to the gate terminal of transfer gate transistor Q2 (see FIG. 1) by way of control signal $TG_Y$ during integration. As indicated in FIG. 9(B), saturation check voltage $TG_{SAT-CHK}$ is optimized carefully in order to allow partial charge transfer when the charge stored on photodiode node PD exceeds a predetermined value (e.g., 50% of saturated potential $PD_{SAT}$). In the case illustrated in FIG. 9(B), because the charge stored on photodiode node PD is equal to saturated potential $PD_{SAT}$, current flows from over the lowered barrier potential TG to memory node MN. As a result of this partial charge transfer, the potential on memory node MN is necessarily changed (e.g., memory node MN changes from initial potential $FD_0$, shown in FIG. 9(A), to a higher potential V1, shown in FIG. 9(B)). In contrast, as indicated in FIGS. 10(A) and 10(B), when the charge stored on photodiode node PD is significantly below saturated potential $PD_{SAT}$, the lowered barrier potential produced by saturation check voltage $TG_{SAT-CHK}$ remains high enough to prevent charge transfer from photodiode node PD to memory node MN, and the potential on memory node MN remains unchanged (e.g., memory node MN remains at initial potential $FD_0$ in both FIG. 10(A), where $TG=TG_{OFF}$, and FIG. 10(B), where $TG=TG_{SAT-CHK}$).

Saturation check voltage $TG_{SAT-CHK}$ needs to be carefully chosen to make sure that only photodiodes that accumulate the correct charge will start "spilling" to memory node MN. The preferred Saturation check voltage $TG_{SAT-CHK}$ is between $TG_{OFF}$ (VSS) and $TG_{ON}$ (VDD). In addition, the period of time for which electrons are allowed to spill over the "saturation check" barrier ($TG_{SAT-CHK}$) should be carefully optimized—too long of a period will lead to diffusion of electrons above the barrier even if the intermediate photodiode charge is well below the "saturation check" barrier. As rule of thumb, if the "saturation check" barrier is on the order of 100 nsec, electrons which are located 10 KT below the barrier will not be able to diffuse above it. One last point, in practice pixel designers have two options when designing a pixel: first, pixels with Full-Well-Capacity (FWC), which are diode limited and the diode controls the saturation of pixel; and second, pixels with FWC limited by FD, which roughly means that the floating diffusion capacitance is smaller than the diode capacitance.

Figure 11A:
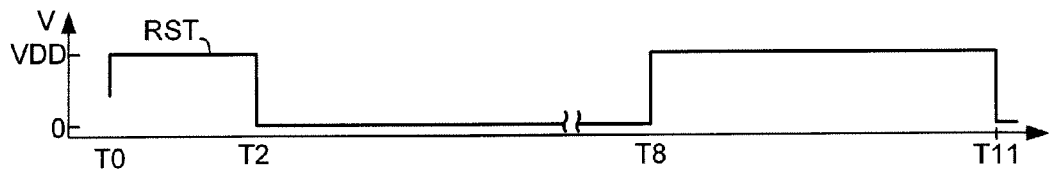
FIGS. 11(A), 11(B), 11(C) and 11(D) are timing diagrams showing a saturation check process performed during operation of the HDR CMOS image sensor of FIG. 1 according to another specific embodiment of the present invention.
Figure 11B:
Figure 11C:
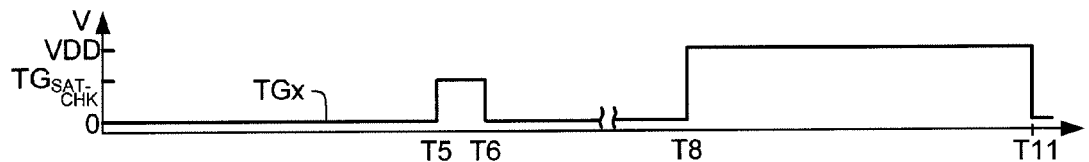
Figure 11D:
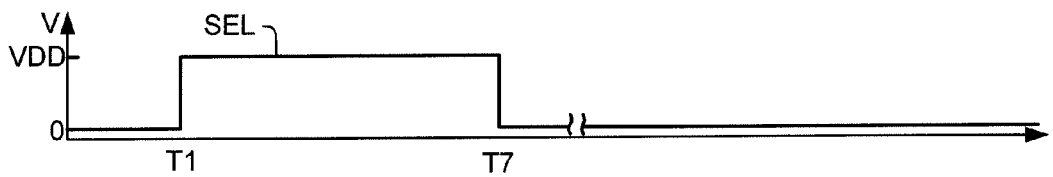

FIGS. 11(A) to 11(D) are simplified timing diagrams illustrating a saturation check process according to an exemplary embodiment of the present invention. Specific transistors are referenced to FIG. 1 unless otherwise specified. The saturation check process typically starts by resetting memory node MN to system voltage (i.e., by turning on reset transistor Q1 between times T0 and T2, as shown in FIG. 11(A), and turning on select transistor Q4 at time T1, as shown in FIG. 11(D)). Note that, prior to beginning the saturation check, it is necessary to store the value at memory node MN in a column level memory bank, as described in additional detail below. After memory node MN is reset, transfer gate control transistor Q5 is turned on by toggling control signal $TG_Y$ to high at time T3 (see FIG. 11(B)), and then briefly control changing signal $TG_X$ to saturation check voltage $TG_{SAT-CHK}$ at between time T5 and T6, thereby partially activating transfer gate Q2 as described above. The resulting signal at memory node MN is then sampled through correlated sampling before and after the partial transfer. Control signal $TG_Y$ is then toggled low and then control signal SEL is turned off at time T7. The resulting signal read from memory node MN between times T5 and T6 is then used for a "fast decision" done on the column level whether to start integration again by transferring all electrons out of the diode for a given pixel. Full transfer on a given column in a given row (x,y accessing for each pixel in the array) is done by activating control signal $TG_X$ to select the desired row at time T8 (see FIG. 11(C)), and then setting control signal $TG_Y$ to the full_transfer_voltage between times T9 and T10 (see FIG. 11(B)), thereby turning on transfer gate Q2. Notice that the RST transistor needs to be activated during this time as well (see FIG. 11(A)). For pixels 110A (see FIG. 3, discussed above), the column-wise power supply needs to be set to VDD for the entire operation. For pixels 110B (see FIG. 5, discussed above), the column wise MN_V needs to be set to VDD for all operation.

Figure 12A:
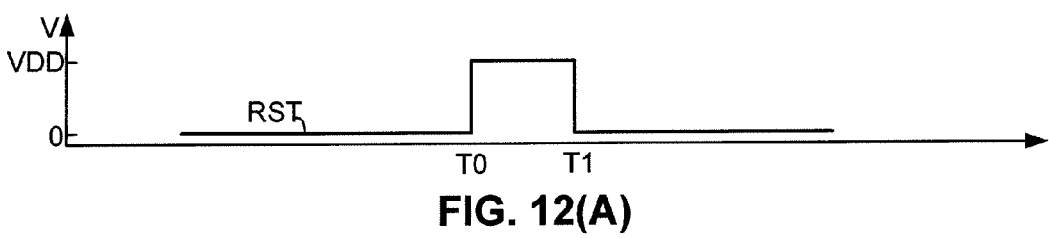
FIGS. 12(A) and 12(B) are simplified timing diagrams showing a charge transfer process performed during operation of the HDR CMOS image sensor of FIG. 1 according to another specific embodiment of the present invention.
Figure 12B:
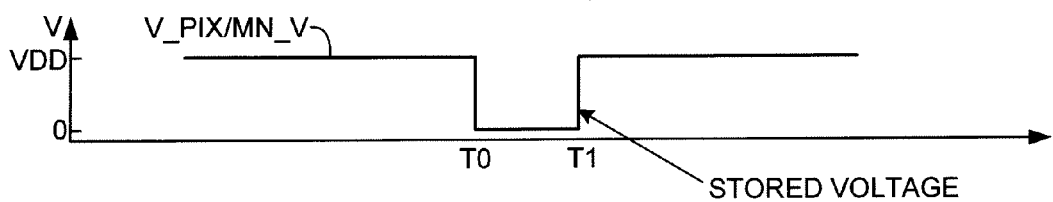

FIGS. 12(A) and 12(B) are simplified timing diagrams showing a process for writing information into memory node MN according to another embodiment of the present invention. In particular, the process is performed by setting the column-wise pixel power supply (VDD control for pixels 110A of FIG. 3, and memory node voltage source MN_V for pixels 110B of FIG. 5) as indicated in FIG. 12(B), and activating reset transistor Q1 (e.g., by toggling reset control signal RST high as indicated in FIG. 12(A)). Storing the desired information on memory node MN is than preformed by simple de-activating the RST gate.

Referring again to FIG. 1, according to another aspect of the present invention, exposure control circuit 120 also includes readout circuitry 170 for reading the final non-saturated photodiode charge from each pixel 110 using low noise Correlated Double Sampling (CDS) techniques. In particular, because each pixel 110 includes a transfer gate transistor Q2 between its photodiode P and memory node MN, the HDR CMOS image sensor 100 of the present invention is also capable of performing a CDS readout process at the end of the exposure frame period by writing a reset value to the memory node, and then sequentially reading the reset value and the final non-saturated photodiode charge value from each pixel.

Figure 13A:
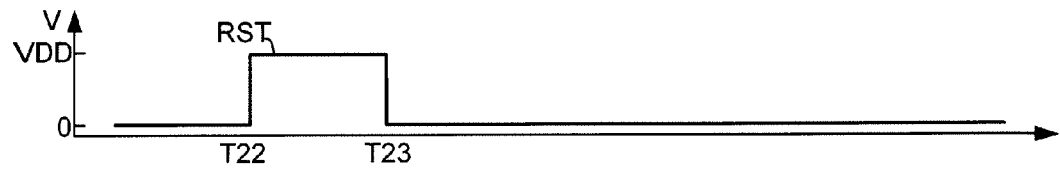
FIGS. 13(A), 13(B), 13(C), 13(D), 13(E), 13(F) and 13(G) are timing diagrams showing a CDS readout process performed during operation of the HDR CMOS image sensor of FIG. 1 according to another specific embodiment of the present invention.
Figure 13B:
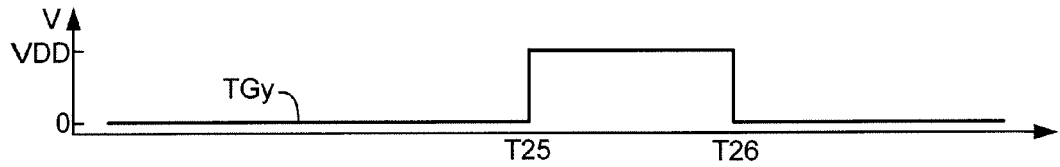
Figure 13C:
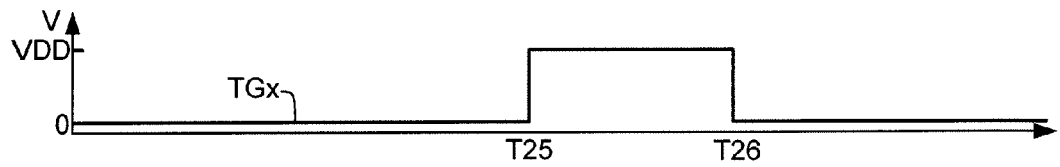
Figure 13D:
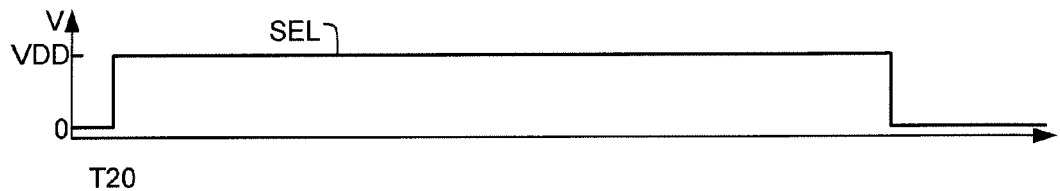
Figure 13E:
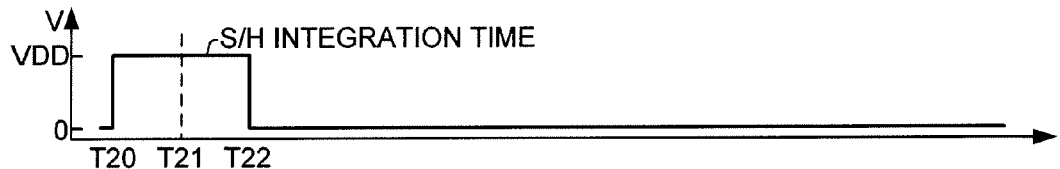
Figure 13F:
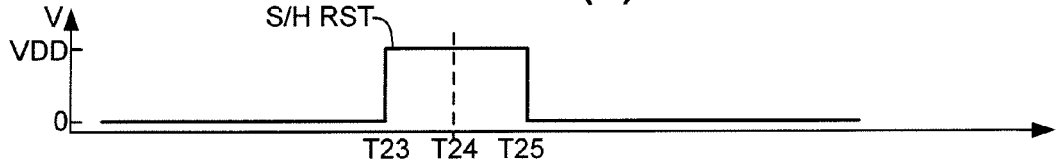
Figure 13G:
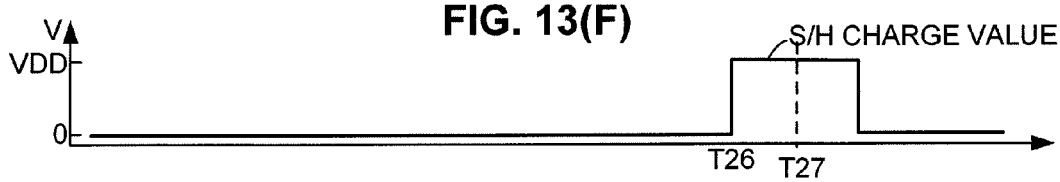

FIGS. 13(A) to 13(F) are timing diagrams showing an exemplary readout process involving three sample and hold (S/H) sequences that is performed in accordance with a specific embodiment of the present invention. The first S/H sequence (FIG. 13(E)) is performed at the beginning of the readout process between times T20 and time T22, where select control signal SEL is toggled high at time T20 (FIG. 13(D) to transfer the final integration time value from memory node MN, the sample is taken at time T21, and reset control signal RST is toggled high at time T22 to reset memory node MN to a predetermined reset value (e.g., VDD or 0V). At time T23, reset control signal RST again toggles low to isolate memory node MN, and the resulting reset value is read at time T23 during the second sample and hold sequence shown in FIG. 13(F). The third sample and hold sequence involves reading the final photodiode charge value, and therefore must be preceded by transfer of the final photodiode charge value to memory node MN at time T25, which is accomplished by turning on the transfer gate transistor (i.e., by activating control signals TG$_Y$ and TG$_X$ as shown in FIGS. 13(B) and 13(C)). After the photodiode charge is fully transferred to memory node MN (e.g., at time T26), the transfer gate transistor is deactivated, and then the third sample and hold sequence is performed (FIG. 13(G)) with the final charge value is taken at time T27. Because CDS techniques are utilized during readout of the final non-saturated photodiode charge, the HDR CMOS image sensor 100 of the present invention provides superior image data quality over a wide dynamic range.

The second and third (RESET and SIGNAL) sample and hold sequences described above with reference to FIGS. 13(F) and 13(G) are consistent with a standard low noise 4T operation. Again, the fact that the RESET and SIGNAL are fully correlated due to the 4T operation is one of the main advantage of the present invention for reading the low-light portions of the image. Note that, for pixels 110A (FIG. 3), the column-wise power supply needs to be set to VDD for the entire readout operation, and for pixels 110B (FIG. 5) the column wise MN_V needs to be set to VDD for the entire readout operation.

According to another aspect of the invention, each pixel's allotted exposure frame period (i.e., its available integration period) is partitioned into three or more successively shorter interval time periods, and the exposure control circuit selectively checks the extrapolated saturation state of each pixel at the end of each interval time period.

Figure 14:
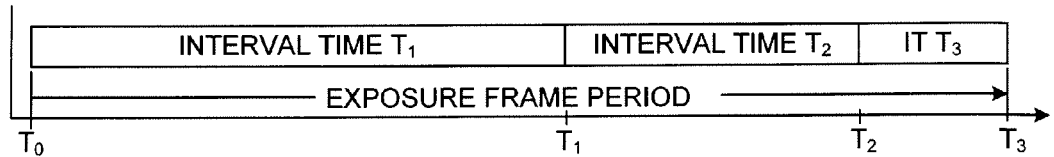
FIG. 14 is a simplified diagram showing an exposure frame period separated into three interval time periods according to an exemplary embodiment of the present invention.

According to another aspect of the present invention, the exposure frame period, which is the total integration time available for image capturing, is divided into L sequentially smaller time intervals $T_1, T_2 \ldots T_L$, where each interval is followed by a shorter interval. In one example, the shortest (shortest) time interval $T_L = \frac{1}{2}^L$, with the next shortest $T_{L-1}$ equal to twice the shortest interval (i.e., $T_{L-1} = 2 \times T_L$). FIG. 14 is a simplified timing diagram depicting the division of an exposure frame period into three time intervals (i.e., L=3) according to an exemplary embodiment. The first time interval ("interval time $T_1$") extends from a beginning of the exposure frame period (time $T_0$) to a first time point (time $T_1$) and is equal to five-eights (⅝ths) of the total exposure frame period, the second time interval ("interval time $T_2$") extends from the first time point (time $T_1$) to a second time (time $T_2$) and in this embodiment is equal to one-quarter (2/8ths) of the total exposure frame period, and the third time interval ("interval time $T_3$") extends from the second time point (time $T_2$) to an end of the exposure frame period (time $T_3$) and is equal to one-eighth (⅛th) of the total exposure frame period. Thus, time intervals $T_1$ to $T_3$ are successively shorter in that the period between time points $T_0$ and $T_1$ is longer than the period between time points $T_1$ and $T_2$, which in turn is longer than the period between time points $T_2$ and $T_3$.

According to another specific embodiment of the present invention, each time interval $T_1, T^2 \ldots T_L$ of an exposure frame period is assigned a unique analog voltage value between the $V_{SAT}$ (lowest possible voltage at the pixel output) and $V_{DARK}$ (the highest voltage possible at the pixel output). For the example, when L=3, voltage $V_1$ assigned to time interval $T_1$ can be $V_{DARK}-\Delta V$, voltage $V_2$ assigned to time interval $T_2$ can be $V_{DARK}-2\times\Delta V$, and voltage $V_3$ assigned to time interval $T_3$ can be equal to $V_{DARK}-3\times\Delta V$, where voltage change $\Delta V$ is carefully defined in order to achieve good discrimination between the different voltage levels. The simplest way to define $\Delta V$ is to set $$\Delta V = \frac{V_{DARK} - V_{SAT}}{L}.$$

In addition to voltages $V_1$ to $V_N$, an additional voltage $V_0 = V_{DARK}$ is also used. Two remarks are in place here: first, the number of time intervals cannot be arbitrary large because dark current of the MN diffusions and it's parasitic light sensitivity can cause some decrease of MN voltage; and second the light sensitivity of MN should be decreased with proper pixel design and additional AB transistor which will evacuate photo-electron from the photodiode to VDD.

Figure 15:
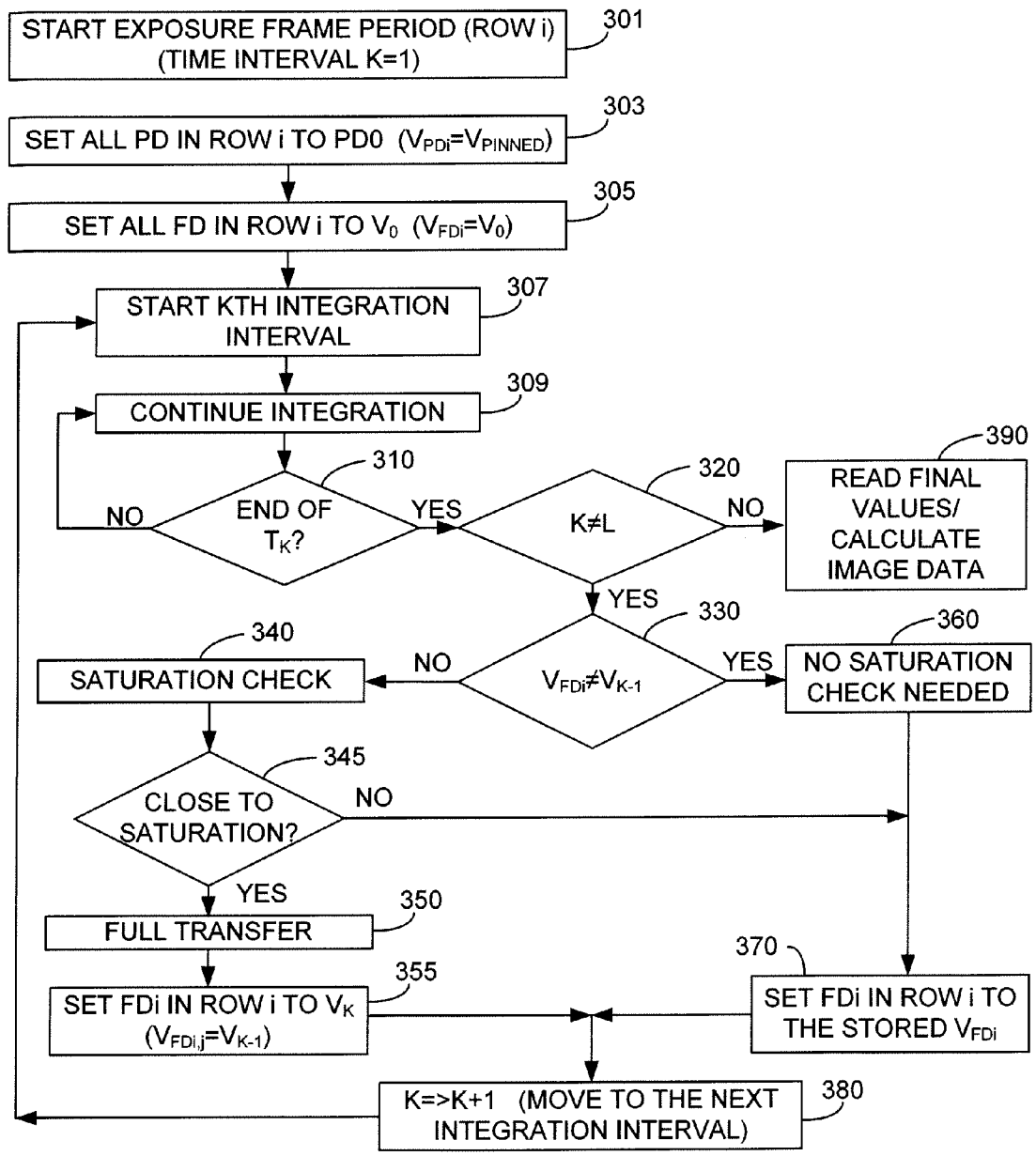
FIG. 15 is a simplified flow diagram showing a simplified method for operating the HDR CMOS image sensor of FIG. 1 according to another embodiment of the present invention.

FIG. 15 is a simplified flow diagram showing a detailed description of the operation of HDR image sensor 100 utilizing the partitioned exposure frame interval of FIG. 14 according to a specific embodiment of the present invention.

Referring to the upper portion of FIG. 15, immediately prior to or at the start of the exposure frame period for a selected row "i" (i.e., at the start of the first interval, so K=1; block 301), all photodiodes are reset (block 303), then all memory nodes MN are set to initial voltage values (e.g., 0V; block 305). Upon photodiode reset, integration begins for the first interval (K=1; block 307), and integration continues (block 309) until then end of the first interval (YES in block 310, and YES branch in block 320), where the process moves to block 330.

Referring to block 330, the memory node MN value is read for each pixel using a simple DS or single sample readout method, and the MN value is stored in a column level memory (again this check is always done in a row-level). Because the first time interval is being processed, all pixels are subject to saturation check (i.e., the "NO" branch is take from block 330 to block 340). After subsequent time intervals, when the read-out MN value is different from $V_{k-1}$, it means that the photodiode charge was far from saturation after the previous interval time (i.e., this test verifies that the photodiode will be in its linear operating (non-saturated) region at the end of the exposure frame period), and integration is allowed to proceed without checking (block 360), and the interval time value on memory node MN is set again to the value which was stored on column memory (block 370). After the first time interval, or after any subsequent interval in which the read-out MN indicates that a full transfer was performed on the pixel after the previous time interval, a saturation check is performed (block 340) in the manner described above. If the saturation check is negative (NO branch from block 345), then the interval time value on memory node MN is set again to the value which was stored on column memory (block 370). This one of the most important features of the HDR operation; that is, pixels which corresponds to low light are integrating for all frame time without disturbance. If the saturation check is positive (YES branch from block 345), then a full transfer (i.e., photodiode reset) is performed (block 350), and then a new interval time value is written into memory node MN indicating the time period in which the full transfer occurred (block 355). The integration process then continues to the next time interval (block 380).

Blocks 307 to 380 are then performed as set forth above until the end of the last interval (i.e., K=L in block 320), when the process moves to blocks 270 (final readout) and 280 (image value calculation) as described above with reference to FIG. 2. Utilizing the time interval format introduced above with reference to FIG. 14, the final time interval value read from memory node MN should be a voltage discreetly chosen from the predetermined voltages $V_0$ to $V_L$. The transformation for voltages to integration time is calculated using a simple look up table which transforms $V_k \to k$ and using the formula:

$$\text{Pixel\_Integration\_Time} = \sum_{i=k+1}^{L} T_k$$

For extremely bright pixel integration can be short as the smallest interval. The final photodiode charge values are also read from each pixel using CDS techniques, and then the illumination for each pixel is calculated, for example, as a ratio of the collected photodiode charge value to the exposure time:

$$\text{Pixel\_Ilumination\_Value} = \frac{\text{collected\_charge}}{\text{Integration time}}$$

FIGS. 16-19 are simplified potential diagrams illustrating three exemplary pixels (pixels 110(i,1), 110(i,2) and 110(i,3)) that respectively receive low, medium and high light during operation of an HDR image sensor of the present invention. The operation described with reference to FIG. 16 covers a single arbitrarily selected row "i" of image sensor 100 (taking advantage of the rolling shutter operation), so the three pixels are assumed to be in the same row "i", but are not necessarily disposed adjacent to each other. The described operation is generally consistent with the processes described above with reference to FIGS. 2 and 15. It is also understood that the described operation is sequentially repeated for each row of and image sensor 100.

FIGS. 16(A) to 16(D) illustrate pixels 110(i,1), 110(i,2) and 110(i,3) at the end of the first time interval of the exposure frame period.

Figure 16A:
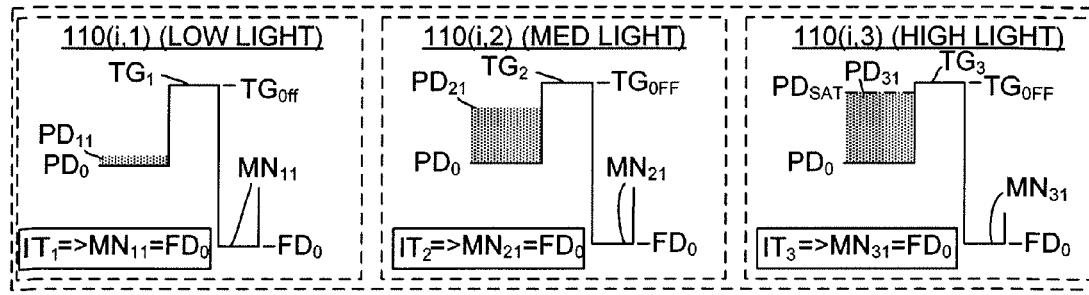
FIGS. 16(A), 16(B), 16(C) and 16(D) are potential diagrams depicting three pixels of the HDR CMOS image sensor of FIG. 1 during operation utilizing the method of FIG. 15 at the end of a first integration period of the three interval time periods of FIG. 14 according to an exemplary embodiment of the present invention.

FIG. 16(A) illustrates the process of reading the interval time values $IT_1$, $IT_2$ and $IT_3$ respectively stored on the memory nodes of each pixel 110(i,1), 110(i,2) and 110(i,3). Because the readout process is performed after the first time interval, the memory node values $MN_{11}$, $MN_{21}$ and $MN_{31}$ of all three pixels are equal to an initial analog value $FD_0$.

Figure 16B:
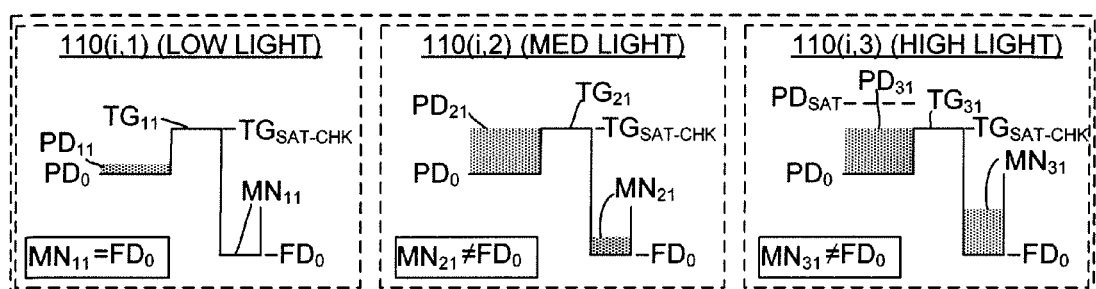

FIG. 16(B) illustrates the process of performing a saturation check on each of the pixels 110(i,1), 110(i,2) and 110(i,3) by reducing the transfer gate barrier potentials $TG_{11}$, $TG_{21}$ and $TG_{31}$ to saturation check voltage $TG_{SAT\text{-}CHK}$ in the manner described above, and measuring the resulting memory node potentials $MN_{11}$, $MN_{21}$ and $MN_{31}$. As indicated in pixel 110(i,1), the low applied light produces a small photodiode potential $PD_{11}$ that is much less than saturation check voltage $TG_{SAT\text{-}CHK}$, so no change is detected at memory node $MN_{11}$ (i.e., $MN_{11}=FD_0$ at the end of the saturation check). Conversely, due to the longer exposure time associated with the first time interval, both the medium and high applied light produce a photodiode potential $PD_{21}$ and $PD_{31}$ that are greater than saturation check voltage $TG_{SAT\text{-}CHK}$, so positive saturation checks are generated for pixels 110(i,2) and 110(i,3) (i.e., memory node $MN_{21} \neq FD_0$ and memory node $MN_{31} \neq FD_0$ at the end of the saturation check).

Figure 16C:
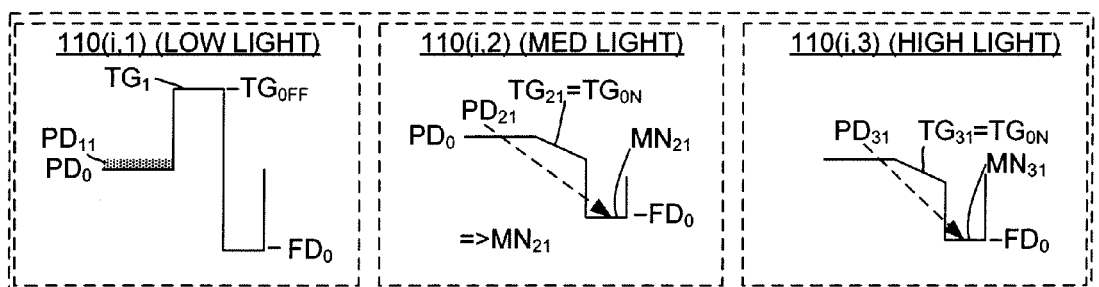

FIG. 16(C) illustrates the full transfer process selectively performed by pixels 110(i,1), 110(i,2) and 110(i,3) at the end of the first time interval. Because of the negative saturation check in pixel 110(i,1), full transfer is skipped (not performed), and transfer gate barrier potential $TG_{11}$ is reset at $TG_{OFF}$. Conversely, because of the positive saturation checks in pixels 110(i,2) and 110(i,3), full transfer is performed by changing transfer gate barrier potentials $TG_{21}$ and $TG_{31}$ to $TG_{ON}$ (with the reset gate activated and memory node voltage MN_V equal to system voltage VDD), causing a full transfer of photodiode potentials $PD_{21}$ and $PD_{31}$ to memory nodes $MN_{21}$ and $MN_{31}$, which are maintained at $FD_0$ by memory node voltage MN_V. Referring briefly to FIG. 1, the importance of separate transfer gate control signals $TG_X$ and $TG_Y$ becomes apparent at this point because individual pixels in each row are controllable during the full transfer process in a column-wise manner by applying an appropriate transfer gate control signal $TG_Y$, whereby pixels receiving low light remain undisturbed while pixels receiving high light can be reset.

Figure 16D:
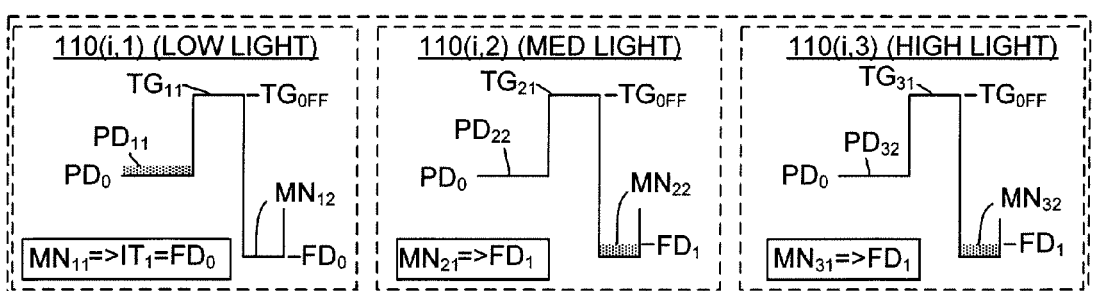

FIG. 16(D) illustrates the process of writing updated time interval values into pixels 110(i,1), 110(i,2) and 110(i,3) at the end of the first time interval. In the present example, because photodiode potential $PD_{11}$ remains undisturbed in pixel 110(i,1), the interval time value $IT_1$ written to memory node $MN_{11}$ is the same as that read from memory node $MN_{11}$ in the first step described above with reference to FIG. 16(A). Conversely, because photodiode potentials $PD_{21}$ and $PD_{31}$ were reset in pixels 110(i,2) and 110(i,3), the interval time values $IT_2$ and $IT_3$ written to memory nodes $MN_{21}$ and $MN_{31}$ are updated (i.e., an analog voltage $FD_1$ is written into both memory nodes $MN_{21}$ and $MN_{31}$) to reflect that the actual interval time for pixels 110(i,2) and 110(i,3) is shorter than that of pixel 110(i,1).

FIGS. 17(A) to 17(D) illustrate pixels 110(i,1), 110(i,2) and 110(i,3) at the end of a second time interval of the exposure frame period.

Figure 17A:
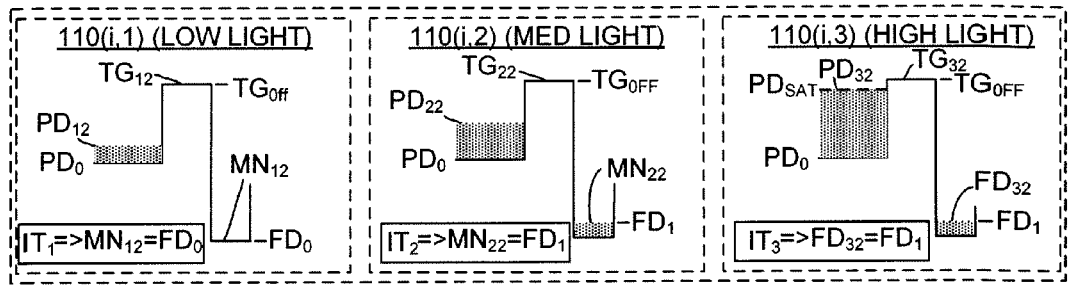
FIGS. 17(A), 17(B), 17(C) and 17(D) are potential diagrams depicting three pixels of the HDR CMOS image sensor of FIG. 1 during operation utilizing the method of FIG. 15 at the end of a second integration period of the three interval time periods of FIG. 14 according to the exemplary embodiment of the present invention.

FIG. 17(A) illustrates the process of reading the interval time values $IT_1$, $IT_2$ and $IT_3$ respectively stored on the memory nodes of each pixels 110(i,1), 110(i,2) and 110(i,3). Due to the operation described above with reference to FIG. 16(D), memory node value $MN_{12}$ of pixel 110(i,1) is equal to initial analog value $FD_0$, but memory node values $MN_{22}$ and $MN_{32}$ of pixels 110(i,2) and 110(i,3) are equal to analog value $FD_1$.

Figure 17B:
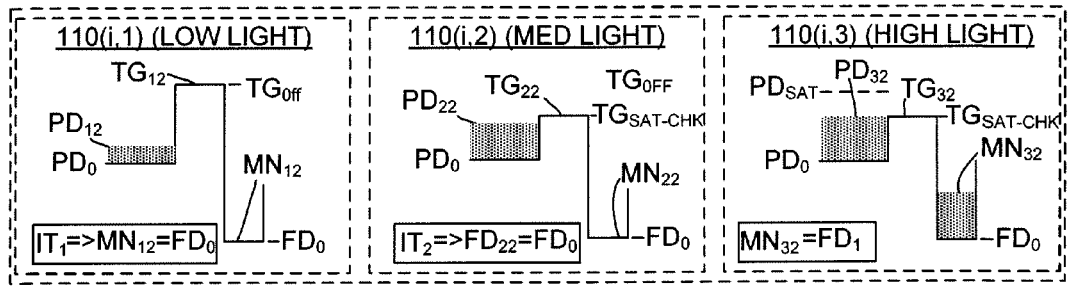

FIG. 17(B) illustrates the process of selectively performing a saturation check on pixels 110(i,1), 110(i,2) and 110(i,3). In this embodiment, because the interval time value $IT_1$ is equal to initial analog value $FD_0$ (indicating that photodiode charge $PD_{12}$ was far from saturation after the first time interval), the saturation check is skipped for pixel 110(i,1), and photodiode charge $PD_{12}$ continues to integrate undisturbed. Conversely, because the interval time values $IT_2$ and $IT_3$ are equal to updated analog value $FD_1$ (indicating that photodiode charges $PD_{22}$ and $PD_{32}$ were close to saturation after the first time interval), the saturation check is performed on pixels 110(i,2) and 110(i,3) in the manner described above (i.e., by reducing the transfer gate barrier potentials $TG_{22}$ and $TG_{32}$ to saturation check voltage $TG_{SAT\text{-}CHK}$ and measuring the resulting memory node potentials $MN_{22}$ and $MN_{32}$). As indicated in pixel 110(i,2), due to the shorter second time interval, the medium light produces a photodiode potential $PD_{22}$ that is less than saturation check voltage $TG_{SAT-CHK}$ so no change is detected at memory node $MN_{22}$ (i.e., $MN_{22}=FD_1$ at the end of the saturation check). Conversely, even with the shorter exposure time associated with the second time interval, the high applied light received by pixel 110(i,3) produces a photodiode potential $PD_{32}$ that is greater than saturation check voltage $TG_{SAT-CHK}$, so a positive saturation check is generated for pixel 110(i,3).

Figure 17C:
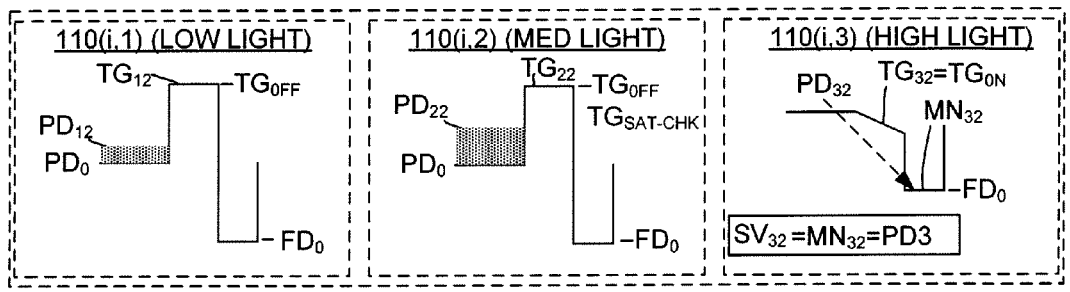

FIG. 17(C) illustrates the full transfer process selectively performed by pixel 110(i,3) at the end of the second time interval. Because of the negative saturation checks in pixel 110(i,1) and 110(i,2), full transfer is skipped (not performed) on these pixels, and transfer gate barrier potentials $TG_{12}$ and $TG_{22}$ are reset to $TG_{OFF}$. Conversely, because of the positive saturation check in pixel 110(i,3), full transfer is again performed by changing transfer gate barrier potential $TG_{32}$ to $TG_{ON}$ (and opening reset transistor Q1), causing a full transfer of photodiode potential $PD_{32}$ to memory node $MN_{32}$, which is maintained at $FD_0$ by memory node voltage MN_V, thus resetting photodiode potential $PD_{32}$.

Figure 17D:
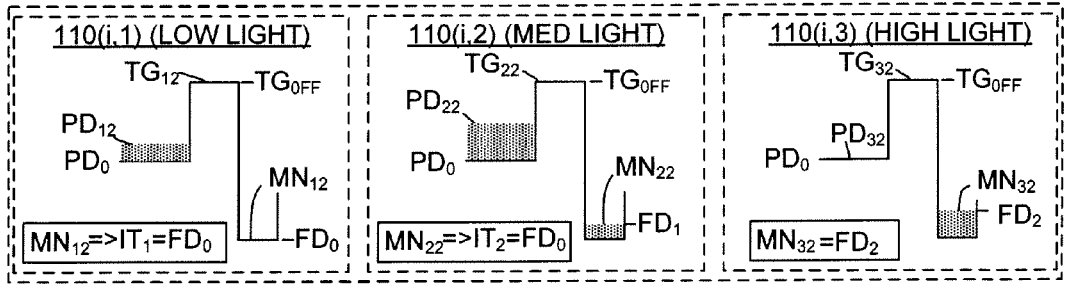

FIG. 17(D) illustrates the process of writing updated time interval values into pixels 110(i,1), 110(i,2) and 110(i,3) at the end of the second time interval. In the present example, because photodiode potentials $PD_{12}$ and $PD_{22}$ remain undisturbed after the second interval in pixels 110(i,1) and 110(i,2), the interval time values $IT_1$, and $IT_2$ written to memory nodes $MN_{12}$ $MN_{22}$ are the same as those read from memory node $MN_{12}$ in the first step described above with reference to FIG. 17(A) (i.e., $FD_0$ is rewritten into $MN_{12}$, and $FD_1$ is written into memory node $MN_{22}$). Conversely, because photodiode potential $PD_{32}$ was reset in pixel 110(i,3), the interval time value $IT_3$ written to memory nodes $MN_{32}$ is updated (i.e., an analog voltage $FD_2$ is written into memory node $MN_{32}$) to reflect that the actual interval time for pixel 110(i,3) is shorter than that of pixels 110(i,1) and 110(i,2).

FIGS. 18(A) and 18(B) illustrate pixels 110(i,1), 110(i,2) and 110(i,3) during a readout process performed at the end of the third time interval (i.e., at the end of the exposure frame period). The readout process shown in FIGS. 18(A) and 18(B) corresponds to block 270 of FIG. 2.

FIG. 18(A) illustrates the process of reading the interval time values $IT_1$, $IT_2$ and $IT_3$ respectively stored on memory nodes $MN_{13}$, $MN_{23}$ and $MN_{33}$ of each pixels 110(i,1), 110(i, 2) and 110(i,3). Due to the operations described above, the final interval time value $IT_1$ read from memory node value $MN_{13}$ of pixel 110(i,1) (i.e., $FD_0$) corresponds to the entire exposure frame period, the final interval time value $IT_2$ read from memory node value $MN_{23}$ of pixel 110(i,2) (i.e., $FD_1$) corresponds to the second and third time intervals (e.g., ⅜ of the exposure frame period), and the final interval time value $IT_3$ (i.e., $FD_3$) read from memory node value $MN_{33}$ of pixel 110(i,3) corresponds to the third time interval (e.g., ⅛ of the exposure time frame).

FIG. 18(B) illustrates the process of reading out final photodiode values $PCV_{13}$, $PCV_{23}$ and $PCV_{33}$ from pixels 110(i,1), 110(i,2) and 110(i,3) by changing transfer gate barrier potentials $TG_{13}$, $TG_{23}$ and $TG_{33}$ to $TG_{ON}$, thereby causing a full transfer of photodiode potentials $PD_{13}$, $PD_{23}$ and $PD_{33}$ to memory nodes $MN_{13}$, $MN_{23}$ and $MN_{33}$, respectively, and then transferring these values out of pixels 110(i,1), 110(i,2) and 110(i,3) using known methods.

FIG. 19 is a simplified diagram indicating a final image data calculation process performed in accordance with block 280 of FIG. 2 for pixels 110(i,1), 110(i,2) and 110(i,3). Each calculation includes the interval time value and final photodiode value read from each pixel. For example, the calculation of a final image data value for pixel 110(i,1) includes interval time value $IT_1$ and final photodiode value $PCV_{13}$, the calculation of a final image data value for pixel 110(i,2) includes interval time value $IT_2$ and final photodiode value $PCV_{23}$, and the calculation of a final image data value for pixel 110(i,2) includes interval time value $IT_2$ and final photodiode value $PCV_{23}$. Note that, by reducing the effective exposure time period for pixel 110(i,2) and 110(i,3), the present invention avoided saturation of the photodiodes in these pixels, while providing a maximum exposure time period IT' (i.e., equal to the full exposure time period) for generating final photodiode charge value $PCV_1$ in response to the low light received by pixel 110(i,1). Similarly, by utilizing successively shorter time intervals, high quality non-saturated photodiode charge value $PCV_2$ is obtained for the medium light image portion received by pixel 110(i,2) over the second and third time intervals, and high quality non-saturated photodiode charge value $PCV_3$ is obtained for the bright light image portion received by pixel 110(i,3) during just the third time interval.

Although the present invention has been described with respect to certain specific embodiments, it will be clear to those skilled in the art that the inventive features of the present invention are applicable to other embodiments as well, all of which are intended to fall within the scope of the present invention. For example, although the process is described above with reference to certain analog signal values and two or three time intervals per exposure frame period, those skilled in the art will recognize that these values and numbers may be changed without altering the spirit of the present invention. In addition, although the present invention is described with reference to digital camera applications, the CMOS image sensor of the present invention may be utilized in any application requiring a high dynamic range image sensor.

The invention claimed is:

1. A high dynamic range CMOS image sensor comprising:
   a pixel array including a plurality of pixels, each pixel having a photodiode, a first node, and a plurality of transistors including a reset gate transistor connected between a memory node voltage source and the first node, and a transfer gate transistor coupled between the photodiode and the first node; and
   an exposure control circuit including:
      first means for resetting a charge stored on the photodiode of a selected pixel of the pixel array to an initial photodiode charge and for storing a first exposure time value in the selected pixel at the beginning of an exposure frame period;
      second means for determining whether a photodiode charge stored on the selected pixel is above a predetermined value after a predetermined portion of said exposure frame period, for causing said first means to reset said photodiode to the initial photodiode charge only if said stored photodiode charge is above the predetermined value after said predetermined portion of said exposure frame period, and for causing said first means to store a second exposure time value in the selected pixel; and
      third means for calculating an image data value for said selected pixel using both a final photodiode charge value read from said photodiode of said selected pixel at the end of said exposure frame period, and a final exposure time value read from the selected pixel at the end of said exposure frame period, wherein said final exposure time value is equal to said first exposure time value when said second means determines that said photodiode charge stored on the selected pixel is below the predetermined value.

2. The high dynamic range CMOS image sensor of claim 1, wherein the first means further comprises means for transferring the initial photodiode charge from the memory node voltage source through the reset gate transistor and the transfer gate transistor to the photodiode of the selected pixel, then turning off the transfer gate transistor, and then writing a first analog signal on the first node of the selected pixel.

3. The high dynamic range CMOS image sensor of claim 2, wherein the second means further comprises means for reading and storing the first exposure time value before determining whether the photodiode charge stored on the selected pixel is above the predetermined value.

4. The high dynamic range CMOS image sensor of claim 3, wherein the second means further comprises means for causing said first means to transfer said initial photodiode charge from the memory node voltage source through the reset gate transistor and the transfer gate transistor to the photodiode of the selected pixel only if said photodiode charge is above the predetermined value after said predetermined portion of said exposure frame period, then turning off the transfer gate transistor, and then writing a second analog signal on the first node of the selected pixel.

5. The high dynamic range CMOS image sensor of claim 3, wherein the second means further comprises means for writing the stored first analog signal on the first node of the selected pixel when said photodiode charge is below the predetermined value after said predetermined portion of said exposure frame period.

6. The high dynamic range CMOS image sensor of claim 1, further comprising fourth means for reading said final exposure time value from the selected pixel at the end of said exposure frame period, and then reading said final photodiode charge value from said photodiode of said selected pixel.

7. The high dynamic range CMOS image sensor of claim 6, wherein said fourth means further comprises means for writing a reset value on said first node after reading said final exposure time value, and then reading said reset value before reading said final photodiode charge value from said photodiode of said selected pixel.

8. The high dynamic range CMOS image sensor of claim 1, wherein each pixel further comprises:
a source-follower transistor connected between a voltage source and a second node, the source-follower transistor having a gate terminal connected to the first node;
a column select transistor connected in series with the source-follower transistor between a first system signal source and an associated column signal line; and
a transfer gate control transistor coupled between a gate terminal of the transfer gate transistor and a second system signal source.

9. The high dynamic range CMOS image sensor of claim 8, wherein each pixel further comprises an anti-blooming transistor coupled between the first system signal source and the photodiode.

10. The high dynamic range CMOS image sensor of claim 8, wherein said second means comprises means for controlling the second system signal source and the transfer gate control transistor of the selected pixel to apply a saturation check voltage to the gate terminal of the transfer gate transistor of the selected pixel, wherein the saturation check voltage has a voltage level between a saturation potential and a fully-pinned potential of the photodiode of the selected pixel.

11. The high dynamic range CMOS image sensor of claim 1, further comprising fourth means for reading said final exposure time value from the selected pixel at the end of said exposure frame period, then writing a reset value on said first node, reading said reset value from said first node, and then reading said final photodiode charge value from said photodiode of said selected pixel.

12. The high dynamic range CMOS image sensor of claim 1, wherein said second means further comprises means for determining whether the photodiode charge stored on the selected pixel is above a predetermined value after both a first time interval and a second time interval predetermined portion of said exposure frame period, for causing said first means to reset said photodiode to the initial photodiode charge if said stored photodiode charge is above the predetermined value after either of said first time interval and said second time interval.

13. The high dynamic range CMOS image sensor of claim 12, wherein said second means further comprises means for storing said second time value in the selected pixel when said photodiode is reset to the initial photodiode charge after said first time interval, and for storing a third time value in the selected pixel when said photodiode is reset to the initial photodiode charge after said second time interval.

14. A high dynamic range CMOS image sensor comprising:
a pixel array including a plurality of pixels, each pixel having a fully-pinned photodiode having a storage capacity equal to a predetermined saturation charge value, a memory node structure defining a first node, and a plurality of transistors including a reset gate transistor connected between a memory node voltage source and the first node, a transfer gate transistor coupled between the photodiode and the first node, and a transfer gate control transistor coupled between a transfer gate control source and the gate terminal of the transfer gate transistor; and
an exposure control circuit including:
means for detecting whether the intermediate photodiode charge stored on the fully-pinned photodiode of a selected pixel is substantially equal to said predetermined saturation charge value after a predetermined portion of the exposure frame period by:
controlling the transfer gate control transistor to apply a saturation check voltage to the gate terminal of the transfer gate transistor of a selected pixel after a predetermined portion of an exposure frame period, the saturation check voltage being selected such that the transfer gate transistor passes a portion of an intermediate photodiode charge stored on the fully-pinned photodiode to the memory node of the selected pixel only if the intermediate charge is substantially equal to said predetermined saturation charge value, and
measuring a memory node charge generated on the first node of the selected pixel while the saturation check voltage is being applied to the gate terminal of the transfer gate transistor;
means for actuating said reset gate transistor and said transfer gate transistor to reset said photodiode to a reset charge only if said memory node charge generated on the first node of the selected pixel includes said portion of an intermediate photodiode charge stored on the fully-pinned photodiode;
means for reading a final photodiode charge value from said selected pixel at the end of said exposure frame period; and
means for calculating an image data value for said selected pixel using the final photodiode charge value.

15. A high dynamic range CMOS image sensor comprising:
- a pixel array including a plurality of pixels, each pixel having a photodiode, a first node, and a plurality of transistors including a reset gate transistor connected between a memory node voltage source and the first node, and a transfer gate transistor coupled between the photodiode and the first node; and
- an exposure control circuit including:
  - means for determining whether a photodiode charge stored on a photodiode of a selected pixel is above a predetermined value after a predetermined portion of an exposure frame period, and for actuating said reset gate transistor and said transfer gate transistor to reset said photodiode to a reset charge only if said photodiode charge is above the predetermined value after said predetermined portion of said exposure frame period;
  - means for sequentially reading both a reset value and a final photodiode charge value from said selected pixel at the end of said exposure frame period using a Correlated Double Sampling (CDS) technique; and
  - means for calculating an image data value for said selected pixel using both the final photodiode charge value and an exposure time value corresponding to an amount of said exposure frame period during which said photodiode of said selected pixel remained undisturbed.

16. A high dynamic range CMOS image sensor comprising:
- a pixel array including a plurality of pixels, each pixel having a photodiode, a first node, and a plurality of transistors including a reset gate transistor connected between a memory node voltage source and the first node, and a transfer gate transistor coupled between the photodiode and the first node; and
- an exposure control circuit including:
  - first means for resetting a charge stored on the photodiode of a selected pixel of the pixel array to an initial photodiode charge and for storing a first exposure time value in the selected pixel at the beginning of an exposure frame period;
  - second means for determining whether a photodiode charge stored on the selected pixel is above a predetermined value after each of a plurality of successively shorter intervals of said exposure frame period, for causing said first means to reset said photodiode to the initial photodiode charge only if said stored photodiode charge is above the predetermined value after any of said plurality of successively shorter intervals, and for causing said first means to store one of said first exposure time value and a second exposure time value in the selected pixel after each of said plurality of successively shorter intervals; and
  - third means for calculating an image data value for said selected pixel using both a final photodiode charge value read from said photodiode of said selected pixel at the end of said exposure frame period, and a final exposure time value read from the selected pixel at the end of said exposure frame period, wherein said final exposure time value is equal to said first exposure time value when said second means determines that said photodiode charge stored on the selected pixel is below the predetermined value.

17. A method for operating a high dynamic range CMOS image sensor, the high dynamic range CMOS image sensor including a pixel array including a plurality of pixels, each pixel having a photodiode, a first node, and a plurality of transistors including a reset gate transistor connected between a memory node voltage source and the first node, and a transfer gate transistor coupled between the photodiode and the first node, wherein the method comprises:
- resetting a charge stored on the photodiode of a selected pixel of the pixel array to an initial photodiode charge and storing a first exposure time value in the selected pixel at the beginning of an exposure frame period;
- determining whether a photodiode charge stored on the selected pixel is above a predetermined value after a predetermined portion of said exposure frame period, causing said first means to reset said photodiode to the initial photodiode charge only if said stored photodiode charge is above the predetermined value after said predetermined portion of said exposure frame period, and causing said first means to store a second exposure time value in the selected pixel; and
- calculating an image data value for said selected pixel using both a final photodiode charge value read from said photodiode of said selected pixel at the end of said exposure frame period, and a final exposure time value read from the selected pixel at the end of said exposure frame period, wherein said final exposure time value is equal to said first exposure time value when said second means determines that said photodiode charge stored on the selected pixel is below the predetermined value.

* * * * *